United States Patent
Crye

(10) Patent No.: US 12,398,978 B2
(45) Date of Patent: Aug. 26, 2025

(54) MOBILE MUNITION ASSEMBLY AND APPARATUS, SYSTEMS, AND METHODS OF EXECUTING A MISSION FOR THE MOBILE MUNITION ASSEMBLY

(71) Applicant: Caleb Crye, Brooklyn, NY (US)

(72) Inventor: Caleb Crye, Brooklyn, NY (US)

(73) Assignee: BLKBOX LLC, Naples, FL (US)

( * ) Notice: Subject to any disclaimer, the term of this patent is extended or adjusted under 35 U.S.C. 154(b) by 470 days.

(21) Appl. No.: 17/703,157

(22) Filed: Mar. 24, 2022

(65) Prior Publication Data
US 2023/0010309 A1    Jan. 12, 2023

Related U.S. Application Data

(60) Provisional application No. 63/220,656, filed on Jul. 12, 2021.

(51) Int. Cl.
*F41G 7/30*      (2006.01)
*B64C 39/02*     (2023.01)
(Continued)

(52) U.S. Cl.
CPC ............ *F41G 7/306* (2013.01); *B64C 39/024* (2013.01); *G05D 1/101* (2013.01); *H04L 63/20* (2013.01); *B64U 70/00* (2023.01); *B64U 2101/60* (2023.01)

(58) Field of Classification Search
CPC ...................................................... F41G 7/306
(Continued)

(56) References Cited

U.S. PATENT DOCUMENTS 6,244,535 B1    6/2001  Felix
7,249,730 B1    7/2007  Flippen, Jr.
(Continued)

FOREIGN PATENT DOCUMENTS

CN    109447398 A    3/2019
CN    112783195 A    5/2021
(Continued)

OTHER PUBLICATIONS

International Search Report and Written Opinion for corresponding PCT/US2022/036760, dated Oct. 28, 2022, 12 pages.
(Continued)

*Primary Examiner* — Reginald S Tillman, Jr.
(74) *Attorney, Agent, or Firm* — Patterson Intellectual Property Law, PC

(57) ABSTRACT

A method of executing a mission for at least one mobile munition assembly in a mission environment is provided, the at least one mobile munition assembly having a container that encloses one or more launchers configured to receive and launch a munition. One or more electronic devices in communicatively coupling with one another in the mission environment form a secure network. A status of a situational awareness (SA) corresponding to each of the one or more electronic devices in the mission environment is transmitted. An input of parameters of the mission for the at least one mobile munition assembly is enabled, the parameters having one or more predefined rules associated therewith and configured to be applied to the parameters based on at least the status of the situational awareness (SA). An authorization or a denial of the mission for the at least one mobile munition assembly is requested.

14 Claims, 13 Drawing Sheets

(51) Int. Cl.
  *B64U 70/00* (2023.01)
  *B64U 101/60* (2023.01)
  *G05D 1/00* (2024.01)
  *H04L 9/40* (2022.01)

(58) Field of Classification Search
  USPC .......................... 89/1.8, 1.815, 37.05, 40.01
  See application file for complete search history.

(56) References Cited

U.S. PATENT DOCUMENTS

| | | | |
|---|---|---|---|
| 7,526,403 B2* | 4/2009 | Hogan | F41G 3/08 |
| | | | 345/440.1 |
| 8,115,149 B1* | 2/2012 | Manole | F42B 10/18 |
| | | | 244/45 R |
| 8,266,999 B1 | 9/2012 | Sisemore | |
| 8,397,613 B2 | 3/2013 | Skurdal et al. | |
| 8,525,088 B1 | 9/2013 | Ell et al. | |
| 9,157,717 B1 | 10/2015 | Carroll et al. | |
| 9,354,029 B2 | 5/2016 | Mace et al. | |
| 9,593,913 B1* | 3/2017 | Wright | F41A 27/30 |
| 9,772,155 B2 | 9/2017 | Schechter | |
| 10,029,791 B2 | 7/2018 | Roemerman et al. | |
| 10,648,781 B1 | 5/2020 | Behiel | |
| 10,757,000 B2 | 8/2020 | Gelvin et al. | |
| 11,105,589 B1 | 8/2021 | Bilbrey et al. | |
| 11,198,519 B1 | 12/2021 | Seeley | |
| 11,355,021 B1 | 6/2022 | Miao | |
| 2010/0000463 A1 | 1/2010 | Root, Jr. | |
| 2010/0320312 A1 | 12/2010 | Bril et al. | |
| 2011/0059421 A1 | 3/2011 | Hickman | |
| 2012/0024136 A1 | 2/2012 | Mccants, Jr. | |
| 2016/0223278 A1 | 8/2016 | Schechter | |
| 2017/0176157 A1* | 6/2017 | Steiert | F41G 7/306 |
| 2017/0286654 A1 | 10/2017 | Nicoll | |
| 2017/0372617 A1 | 12/2017 | Bruno et al. | |
| 2019/0137219 A1* | 5/2019 | Bockmon | F41G 5/16 |
| 2019/0220039 A1 | 7/2019 | Wu et al. | |
| 2019/0316879 A1 | 10/2019 | Fougnies | |
| 2020/0088887 A1 | 3/2020 | Garcia et al. | |
| 2021/0070440 A1 | 3/2021 | Abeles et al. | |
| 2021/0094703 A1 | 4/2021 | Catledge et al. | |

FOREIGN PATENT DOCUMENTS

| | | |
|---|---|---|
| EP | 3081892 A1 | 10/2016 |
| EP | 4239277 A1 | 9/2023 |
| KR | 1020150104323 A | 9/2015 |
| KR | 102021595 B1 | 9/2019 |
| RU | 2213315 C2 | 9/2003 |
| WO | 2016024921 A1 | 2/2016 |
| WO | 2021014101 A1 | 1/2021 |
| WO | 2021156634 A1 | 8/2021 |

OTHER PUBLICATIONS

European Patent Office Search Report for Patent Application No. 22842733.2, dated Apr. 11, 2025, 9 pages.

* cited by examiner

MOBILE MUNITION ASSEMBLY AND APPARATUS, SYSTEMS, AND METHODS OF EXECUTING A MISSION FOR THE MOBILE MUNITION ASSEMBLY

CROSS-REFERENCES TO RELATED APPLICATIONS

This application claims the benefit of U.S. Provisional Patent Application No. 63/220,656, filed Jul. 12, 2021, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office (USPTO) patent file or records, but otherwise reserves all copyright rights whatsoever.

FIELD OF THE DISCLOSURE

The present disclosure relates to a mobile munition assembly, and more particularly to apparatus, systems, and methods of executing a mission for the mobile munition assembly.

BACKGROUND

Launching and/or controlling a flight of a munition subsequent to launch, and executing a mission thereof, are generally known. While some munition assemblies, such as tactical mortars, may be portably transported by one or more users in a mission environment, these munition assemblies are generally not operated with mission execution systems in connection with a launch of the munition from the munition assemblies, nor do they enable a control of precision-guided munitions. Plus, where such munition assemblies (and the mission execution systems therewith) do enable a control of a precision-guided munition, a warhead must be uniquely tailored to the precision-guided munition, thereby preventing interchangeability of munitions (and the warheads therein) for the munition assemblies. Such a loss of interchangeability denies a user—who is operating within the mission environment—the capacity to cycle through munitions having different characteristics associated with the warhead, including whether the warhead is anti-armor, anti-personnel, anti-vehicle (e.g., anti-tank), anti-bunker, smoke-based, etc.

Moreover, current munition assemblies, which are operated with mission executions systems, must be transported by way of vehicle or heavy-duty equipment or machinery, thereby rendering these munition assemblies not practically transportable by a human user in the mission environment. For example, current munition assemblies, such as artillery cannons and tactical mortars, are difficult to maneuver once established in a fixed location, given the weight associated with said munition assemblies and a locking mechanism affixing the munition assemblies to the fixed location. And, current munition assemblies, such as artillery cannons and tactical mortars, must be man-operated by a human user in the mission environment, thereby preventing a user from launching or firing a munition from the munition assembly from a location in the mission environment that is distant or remote from the munition assembly.

Furthermore, current mission execution systems for munition assemblies, the systems of which are configured to detect, identify, and/or target one or more targets in the mission environment, are limited by industry-standard specifications for mission safety, including (without limitation) the MIL-STD-882, DO-178, and other safety-critical standards. Due to these limitations, mission execution systems are generally not implemented on electronic devices made available to a layperson (i.e., a consumer), such as a smart cellular device employing an Apple- or Android-based operating system (OS). These safety-critical standards are generally not met with conventional versions of the aforementioned electronic devices or equivalents thereof because the software, or other executable algorithm, effectuating the process of executing the mission are not independent of hardware or software natively provided for in these electronic devices. Accordingly, because of the lack of independence of the hardware or software natively provided for in these electronic devices, users (or autonomous systems) must rely on costly electronic devices having specially configured hardware and software specifications that provide safety criticality and fail-safe execution, such as a lightweight handheld mortar ballistic computer (LHMBC).

In addition to the foregoing drawbacks, current mission execution systems, even on electronic devices having specially configured hardware and software (as described above), fail to provide real-time feedback of mission approval, whether caused by significant delays in a mission-rejection feedback loop, or through communication errors leading to a failure to reject (or accept) missions for the munition assembly. These failures limit the one or more devices to advising whether to accept or to reject the mission for the munition assembly, but do not, or cannot, authorize an acceptance or a rejection of the mission, such that the mission for the munition assembly may execute the mission in the mission environment. Moreover, current munition execution systems necessitate or require user monitoring or intervention after a mission is approved, thereby preventing an autonomous execution of the mission. And, current mission execution systems generally necessitate or require a centralized authority or hierarchical system, whereby the centralized authority or the hierarchical system provide one or more users with information, data, and analytics on location, nature, or character of the one or more targets in the mission environment. As a result, one or more munition assemblies may not be coordinated in an efficient manner because the one or more munition assemblies require the authorization of mission execution systems by the centralized authority or the hierarchical system, rather than by users operating within the mission environment in which the one or more munition assemblies are deployed. And further, users operating within the mission environment in which the one or more munition assemblies are deployed must provide additional feedback or input to the mission execution systems after the mission is approved, including a designation of a target or a programming of a fuze within the warhead of the munition. Such additionally required actions by the user decrease the efficiency and effectiveness of coordinating and executing mission execution systems for munition assemblies in the mission environment. Thus, there is a need to provide apparatuses, methods, or systems that overcome the foregoing limitations.

BRIEF SUMMARY

The present disclosure provides a novel mobile munition assembly. Specifically, the present disclosure provides a novel mobile munition assembly, as well as a method and a system for executing a mission for the mobile munition assembly.

Embodiments of apparatus, methods, and systems of the present disclosure provide a solution to the shortcomings above. In particular, this disclosure provides a mobile munition assembly for use in a mission environment. The mobile munition assembly may have a container with a stabilizer supported to a frame of the container, the stabilizer of which permits a user of the mobile munition assembly to rapidly and efficiently deploy the mobile munition assembly in the mission environment. Such rapid and efficient deployment of the mobile munition assembly may enable a munition to be launched from the mobile munition assembly with minimal interruption or interference due to a construction thereof. The disclosure also provides a method and system of executing a mission for at least one mobile munition assembly. One or more electronic devices may be communicatively coupled to, and in association with, one another, thereby forming a secure network, such as a mobile ad-hoc network (MANET). Across the one or more electronic devices, signals representative of a situational awareness (SA), such as position location information (PLI), and mission parameters may be entered and received on the one or more electronic devices vis-à-vis an electronic controller executing a mission execution unit. The mission execution unit may comprise at least two modules—a mission module and a safety module—that operate independently of one another to define the mission for the at least one mobile munition assembly, and to determine whether to authorize the mission for the at least one mobile munition assembly.

In the context of executing a mission for a mobile munition assembly, certain embodiments of a method for executing a mission for at least one mobile munition assembly are disclosed. The at least one mobile munition assembly may include a container having a container frame, the container frame having a first end distally located from a second end. The container frame may enclose one or more launchers, and each of the one or more launchers may be configured to receive a munition. A stabilizer, which is associated with the at least one mobile munition assembly, may be operated from a first configuration, wherein a plurality of legs are folded up adjacent to the container frame, to a second configuration, wherein the plurality of legs are pivoted away from the container frame to place to container in an upright position such that an axis defined along the container frame from the first end to the second end is generally orthogonal to a surface of a launch terrain upon which the container is mounted. One or more electronic devices may form a secure network with one another in a mission environment when the one or more electronic devices are communicatively coupled to, and in association with, one another. At least one of the one or more electronic devices may be associated with one or more of the at least one mobile munition assembly. A status of a situational awareness (SA) may be transmitted to each of the one or more electronic devices in the mission environment. An input of parameters of the mission for the at least one mobile munition assembly in the mission environment may be enabled. The parameters of the mission may have one or more predefined rules associated therewith, and the parameters of the mission may be configured to be applied to the parameters of the mission based on at least the status of the situational awareness (SA). An authorization or a denial of the mission for the at least one mobile munition assembly may be requested.

In the context of executing a mission in a mission environment, certain embodiments of a system for executing a mission for at least one mobile munition assembly are disclosed. The at least one mobile munition assembly may comprise a container having a container frame. The container frame may have a first end distally located from a second end, and the container frame may enclose one or more launchers. Each of the one or more launchers may be configured to receive a munition. One or more electronic devices may have a communication unit, and at least one of the one or more electronic devices may be associated with one or more of the at least one mobile munition assembly. A secure network may be formed by the communication unit of the one or more electronic devices communicatively coupled to another of the communication unit of the one or more electronic devices. Each of the one or more electronic devices may be configured to transmit a status of a situational awareness (SA) corresponding to each of the one or more electronic devices in the mission environment. Each of the one or more electronic devices may additionally be configured to enable an input of parameters of the mission for the at least one mobile munition assembly in the mission environment. The parameters of the mission may have one or more predefined rules associated therewith, and the one or more predefined rules may be configured to be applied to the parameters based on at least the status of the situational awareness (SA). And, each of the one or more electronic devices may be further configured to request an authorization or a denial of the mission for the at least one mobile munition assembly.

In one particular and exemplary embodiment, a method of executing a mission for at least one mobile munition assembly in a mission environment is provided. The at least one mobile munition assembly comprises a container having a container frame. The container frame has a first end distally located from a second end, and the container frame encloses one or more launchers. Each of the one or more launchers are configured to receive a munition. The method commences with an operation of operating a stabilizer associated with the at least one mobile munition assembly from a first configuration to a second configuration. In the first configuration, a plurality of legs are folded up adjacent to the container frame, and in the second configuration, the plurality of legs are pivoted away from the container frame to place the container in an upright position, such that an axis defined along the container frame from the first end to the second end is generally orthogonal to a surface of a launch terrain upon which the container is mounted. The method continues with an operation of forming a secure network of one or more electronic devices with one another in the mission environment when the one or more electronic devices are communicatively coupled to, and in association with, one another. At least one of the one or more electronic devices is associated with one or more of the at least one mobile munition assembly. The method continues with an operation of transmitting a status of a situational awareness (SA) corresponding to each of the one or more electronic devices in the mission environment. The method continues with an operation of enabling an input of parameters of the mission for the at least one mobile munition assembly in the mission environment. The parameters have one or more predefined rules associated therewith, and the one or more predefined rules are configured to be applied to the parameters based on at least the status of the situational awareness (SA). The method continues with an operation of requesting an authorization or a denial of the mission for the at least one mobile munition assembly.

In one exemplary aspect according to the above-referenced embodiment, the method may further continue with an operation of deploying the at least one mobile munition assembly on the surface of the launch terrain the mission environment.

In another exemplary aspect according to the above-referenced embodiment, the method may further continue with an operation of identifying one or more targetable assets and one or more non-targetable assets in the mission environment based at least on the parameters of the mission for the at least one mobile munition assembly and an application of the one or more predefined rules to the parameters of the mission.

In another exemplary aspect according to the above-referenced embodiment, the one or more non-targetable assets may include locations corresponding to the one or more electronic devices in the mission environment.

In another exemplary aspect according to the above-referenced embodiment, the one or more predefined rules related to the parameters of the mission may include at least one of information corresponding to at least to one of a location of the one or more electronic devices in the mission environment, a location of the at least one mobile munition assembly in the mission environment, an identification of one or more targetable assets in the mission environment, an identification of one or more non-targetable assets in the mission environment, an altitude of the munition when launched from the at least one mobile munition assembly, a trajectory of the munition when launched from the at least one mobile munition assembly, a flight path of the munition when launched from the at least mobile munition assembly, a type of warhead located within the munition, an impact radius of the munition, or a time constraint on the mission.

In another exemplary aspect according to the above-referenced embodiment, the method may continue with an operation of receiving the authorization of the mission for the at least one mobile munition assembly in the mission environment.

In another exemplary aspect according to the above-referenced embodiment, the method may continue with an operation of selecting one or more of the at least one mobile munition assembly to launch the munition from the one or more of the at least one mobile munition assembly in the mission environment.

In another exemplary aspect according to the above-referenced embodiment, the method may continue with an operation of commanding the one or more of the at least one mobile munition assembly to launch the munition from the one or more of the at least one mobile munition assembly in the mission environment.

In another exemplary aspect according to the above-referenced embodiment, the method may continue with an operation of reporting whether there is a mission error detected by the one or more electronic devices in the mission environment.

In another exemplary aspect according to the above-referenced embodiment, the mission error detected by the one or more electronic devices in the mission environment may include at least one of a loss of communication, on the secure network, of the one or more electronic devices in the mission environment, an uncertainty of a location of the one or more electronic devices in the mission environment, an uncertainty of a location of the at least one mobile munition assembly in the mission environment, a latency in the secure network, an identification of one or more unauthorized devices on the secure network, an alert that the munition is not configured to be launched from one of the one or more launchers in the mobile munition assembly, an alert that at least one of the one or more launchers does not have sufficient power to enable a launch of the munition in the mission environment, an alert that a warhead located with the munition does not conform with the parameters of the mission, or an alert that at least one of the one or more launchers is not arranged in an orientation to enable a vertical launch of the munition.

In another exemplary aspect according to the above-referenced embodiment, the munition may include a warhead having a length ranging from about ten (10) inches to about twenty (20) inches and a weight between about eight (8) pounds and fifteen (15) pounds.

In another exemplary aspect according to the above-referenced embodiment, the secure network may comprise a mobile ad-hoc network (MANET) or a wireless mesh network (WMN).

In another embodiment, a system for executing a mission in a mission environment is provided. The system includes at least one mobile munition assembly comprising a container having a container frame. The container frame has a first end distally located from a second end, and the container frame encloses one or more launchers. Each of the one or more launchers are configured to receive a munition. One or more electronic devices have a communication unit, and at least one of the one or more electronic devices are associated with one or more of the at least one mobile munition assembly. A secure network is formed by the communication unit of the one or more electronic devices communicatively coupled to another of the communication unit of the one or more electronic devices. The one or more electronic devices are configured to transmit a status of a situational awareness (SA) corresponding to each of the one or more electronic devices in the mission environment. The one or more electronic devices are also configured to enable an input of parameters of the mission for the at least one mobile munition assembly in the mission environment. The parameters have one or more predefined rules associated therewith, and the one or more predefined rules are configured to be applied to the parameters based on at least the status of the situational awareness (SA). The one or more electronic devices are further configured to request an authorization or a denial of the mission for the at least one mobile munition assembly.

In one particular and exemplary aspect of the above-referenced embodiment, the munition may have a munition frame, and the munition frame includes a nose, a body, and a tail. The nose may be distally located from the tail, and the body may be positioned between the nose and the tail. Two or more fins may be supported from the munition frame on a location of the body or the tail. Two or more wings may be supported from the munition frame on a location of the body proximate to the nose. A warhead may be located within the munition frame at the nose.

In other particular and exemplary aspects of the above-referenced embodiment, the one or more electronic devices are configured to direct performance of remaining operations from the above-referenced method embodiment and optionally any of the described exemplary aspects thereof.

Unless otherwise defined, all technical and scientific terms used herein have the same meaning as commonly understood by one of ordinary skill in the art to which this invention belongs. The present invention may be embodied in other specific forms without departing from the spirit or essential attributes thereof, and it is therefore desired that the present embodiment be considered in all aspects as illustrative and not restrictive. Any headings utilized in the description are for convenience only and no legal or limiting effect. Numerous objects, features, and advantages of the embodiments set forth herein will be readily apparent to those skilled in the art upon reading of the following disclosure when taken in conjunction with the accompanying drawings.

BRIEF DESCRIPTION OF THE DRAWINGS

Hereinafter, various exemplary embodiments of the disclosure are illustrated in more detail with reference to the drawings.

DETAILED DESCRIPTION

Figure 1A:
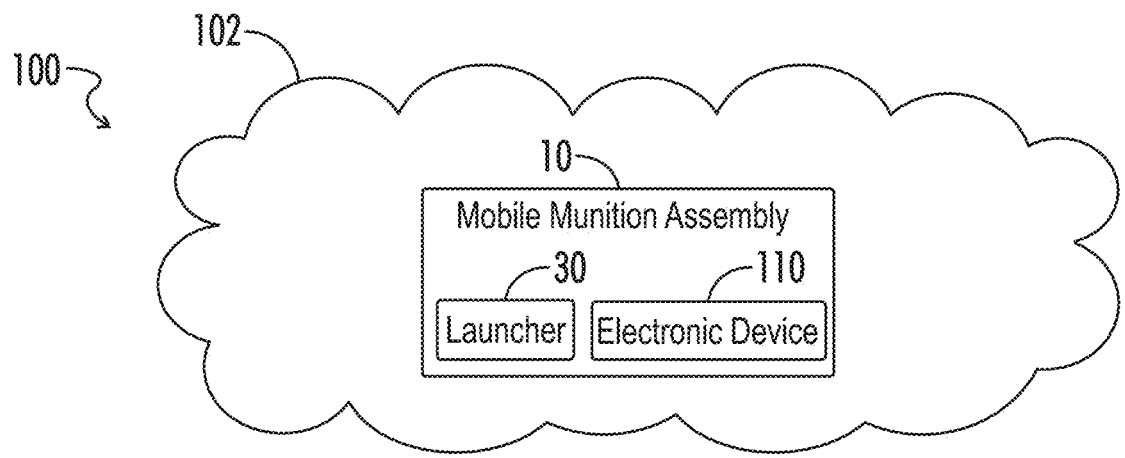
FIGS. 1A-1C illustrate exemplary embodiments of a partial diagram of a system for executing a mission for at least one mobile munition assembly, the system comprising one or more electronic devices in communicative coupling to, and in association with, one another, in accordance with aspects of the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure. Referring generally to FIGS. 1-9, various exemplary embodiments may now be described of apparatuses, systems, and methods for authorizing a mission for at least one mobile munition assembly 10. Various embodiments may now be described of the mobile munition assembly 10, or one or more mobile munition assemblies 10, and methods and systems of implementation thereof, including a mission execution system 100. Specifically, various embodiments may now be described of the mobile munition assembly 10, the mission execution system 100, and a method 200 of executing a mission for at least one mobile munition assembly 10 in a mission environment 90. Where the various figures describe embodiments sharing various common elements and features with other embodiments, similar elements and features are given the same reference numerals and redundant description thereof may be omitted below.

Figure 1B:
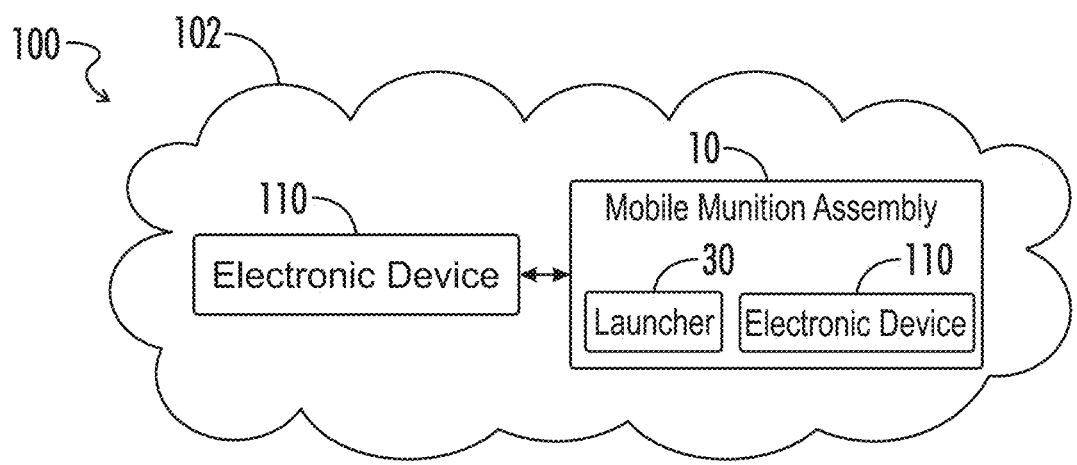
Figure 1C:
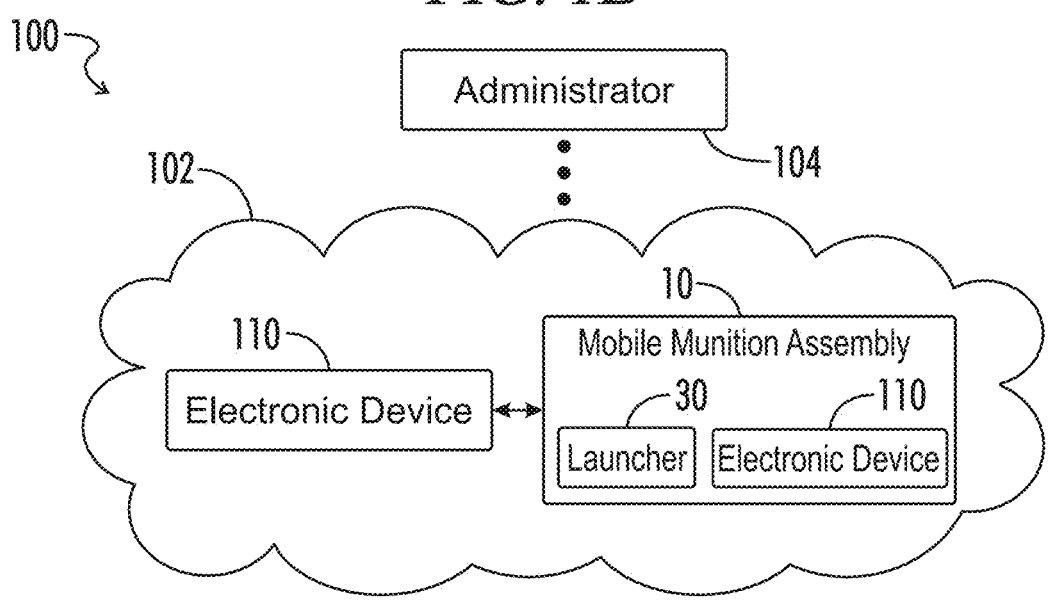

FIGS. 1A-1C illustrate an exemplary embodiment of a partial diagram of the system 100 for executing a mission for at least one mobile munition assembly 10, the mission authorization system 100 comprising one or more electronic devices 110. The one or more electronic devices 110, such as one or more user devices 110, may be associated with one or more of at least one mobile munition assembly 10, the at least one mobile munition assembly 10 having one or more launchers 30 configured to launch a munition 70 from a surface 97 of a launch terrain 96 into an airspace, and subsequently onto or against one or more targetable assets 92 in the mission environment 90, as illustratively conveyed in FIGS. 8-9.

Referring to FIG. 1A, the system 100 may comprise one of one or more electronic devices 110, the one of the one or more electronic devices 110 in association with the at least one mobile munition assembly 10, and the one or more electronic devices 110 establishing a secure network 102. The secure network 102 may comprise a closed network 102 comprising only the one of the one or more electronic devices 110, the closed network 102 having the capability of recruiting and/or accepting another of the one or more electronic devices 110 into the closed network 102, such as by and through authentication keys or access credentials inputted vis-à-vis a user interface (UI) on a display unit 117. Referring to FIG. 1B, the system 100 may comprise a plurality of the one or more electronic devices 110, wherein at least one of the one or more electronic devices 10 is associated with one or more of the at least one mobile munition assembly 10. The plurality of the one or more electronic devices 110 may be communicatively coupled to one another vis-à-vis a communication unit 114 (as further described herein), such that each of the one or more electronic devices 110 are in communicative association with one another. The plurality of the one or more electronic devices 110 may establish, or form, the secure network 102 when the one or more electronic devices 110 are communicatively coupled to, and in association with, one another. Referring to FIG. 1C, the system 100 may comprise a plurality of the one or more electronic devices 110, wherein at least one of the one or more electronic devices 110 is associated with the one or more of the at least one mobile munition assembly 10. The one or more electronic devices 110 communicatively coupled to, and in association with, one another may be recruited or accepted to the secure network 102 by an administrator 104. The administrator 104 may comprise another of the one or more electronic devices 110, or the administrator may comprise a server, a centralized host, or the like, capable of providing and/or maintaining the secure network 102 for the one or more electronic devices 110. For the purpose of the disclosure herein, the system 100 may authorize the mission for the at least one mobile munition assembly 10 vis-à-vis any (one or more) of the one or more electronic devices 110 or the administrator 104, and combinations thereof.

Figure 1D:
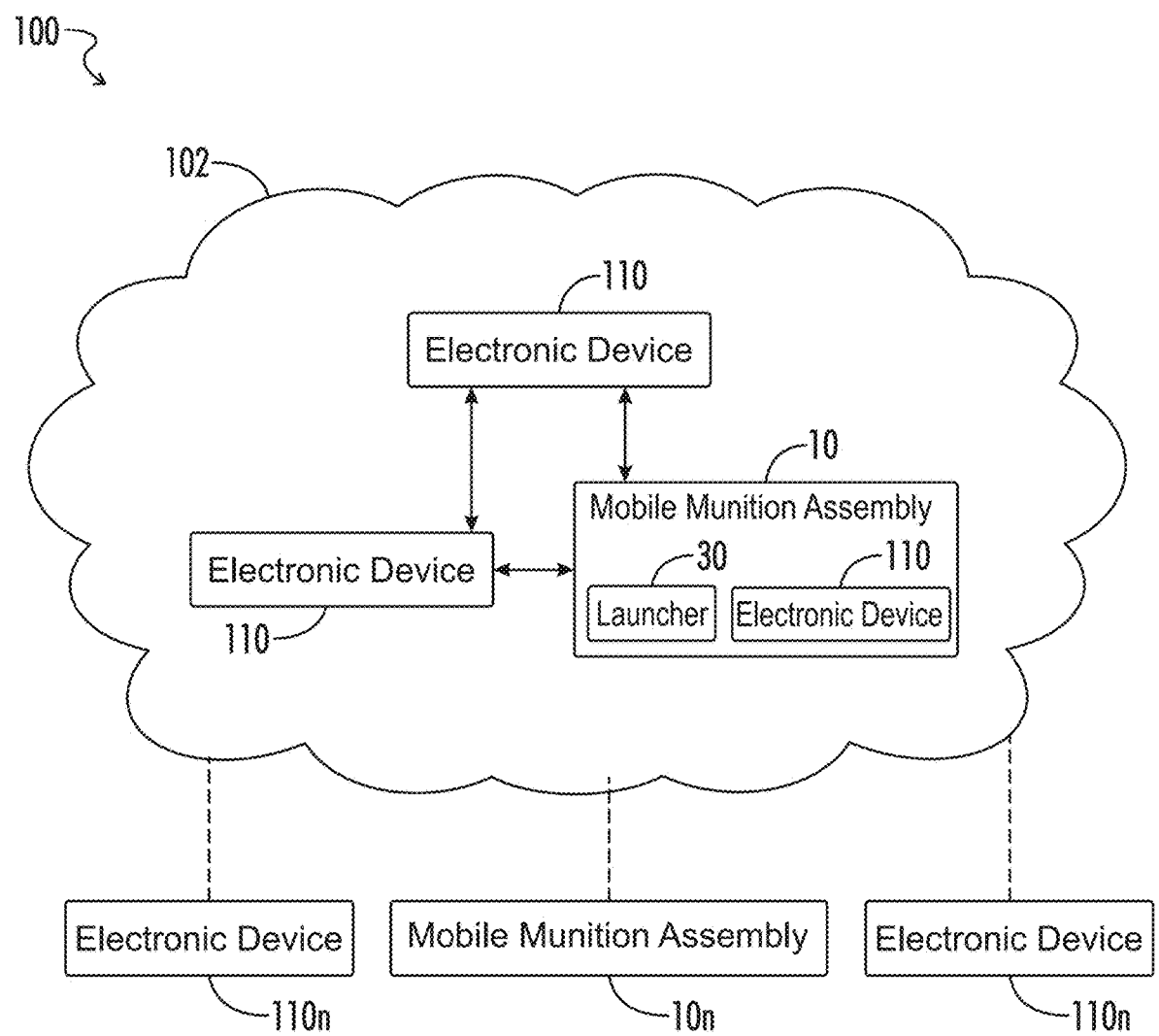
FIG. 1D illustrates an exemplary embodiment of a partial network diagram of a system for executing a mission for at least one mobile munition assembly, in accordance with aspects of the present disclosure.

FIG. 1D illustrates an exemplary embodiment of a partial network diagram of the system 100 for authorizing the mission for at least one mobile munition assembly 10. The system 100 may comprise a plurality of the one or more electronic devices 110 communicatively coupled to, and in association with one another, wherein at least one of the one or more electronic devices 110 is associated with one or more of the at least one mobile munition assembly 10. The communicatively coupling and association of the one or more electronic devices 110 may form, or establish, the secure network 102, including by and through wired or wireless communication (e.g., cellular communication). The secure network 102 may be configured to recruit other of the one or more electronic devices 110n, whether by and through any of the one or more electronic devices 110 or through the administrator 104, or a combination of the foregoing. One or more of the at least one mobile munition assembly 10n may be associated with any (one or more) of the one or more electronic devices 110n recruited to the secure network 102.

Figure 5:
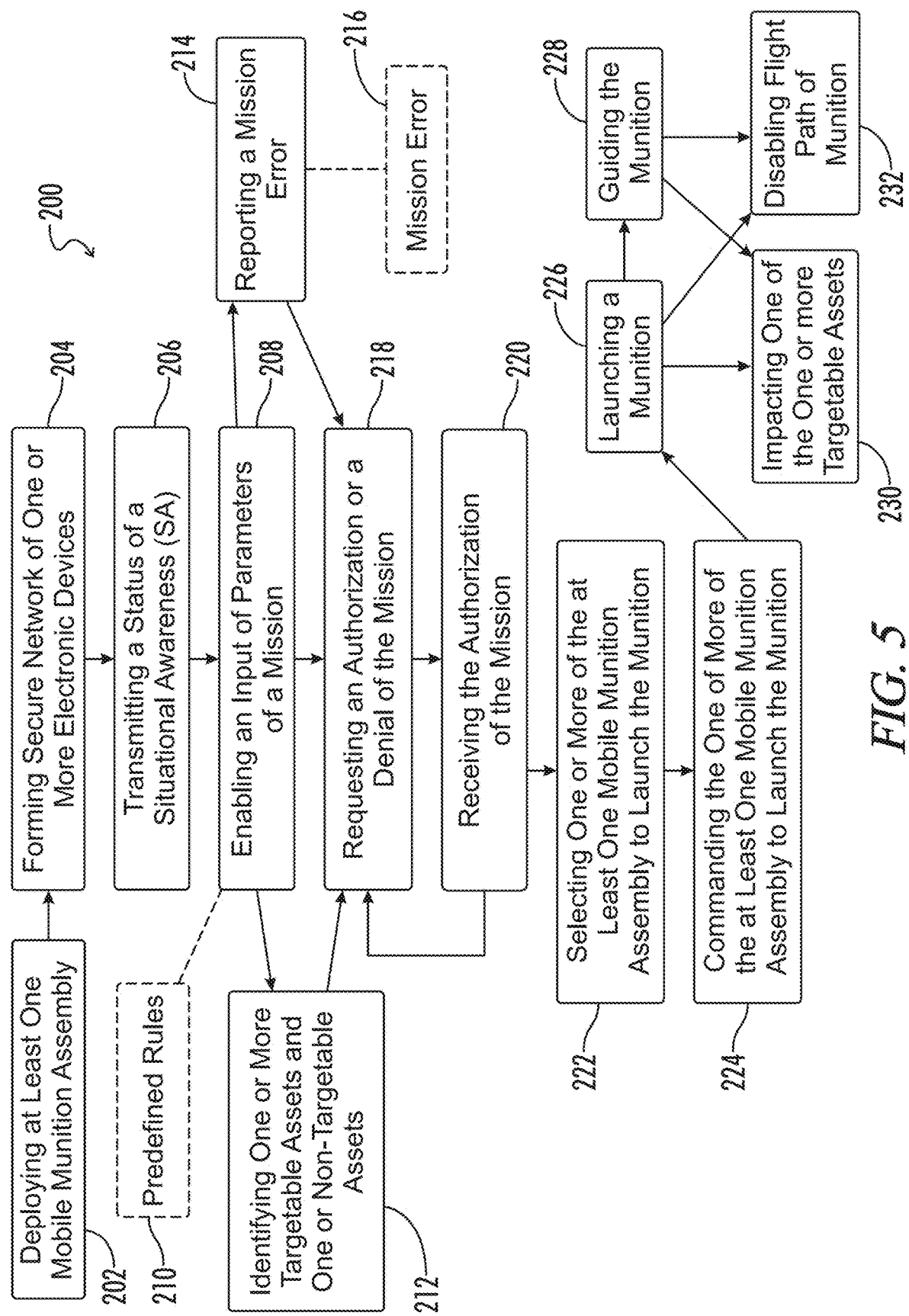
FIG. 5 illustrates a flowchart providing an exemplary embodiment of a method for executing a mission for at least one mobile munition assembly, in accordance with aspects of the present disclosure.
Figure 8:
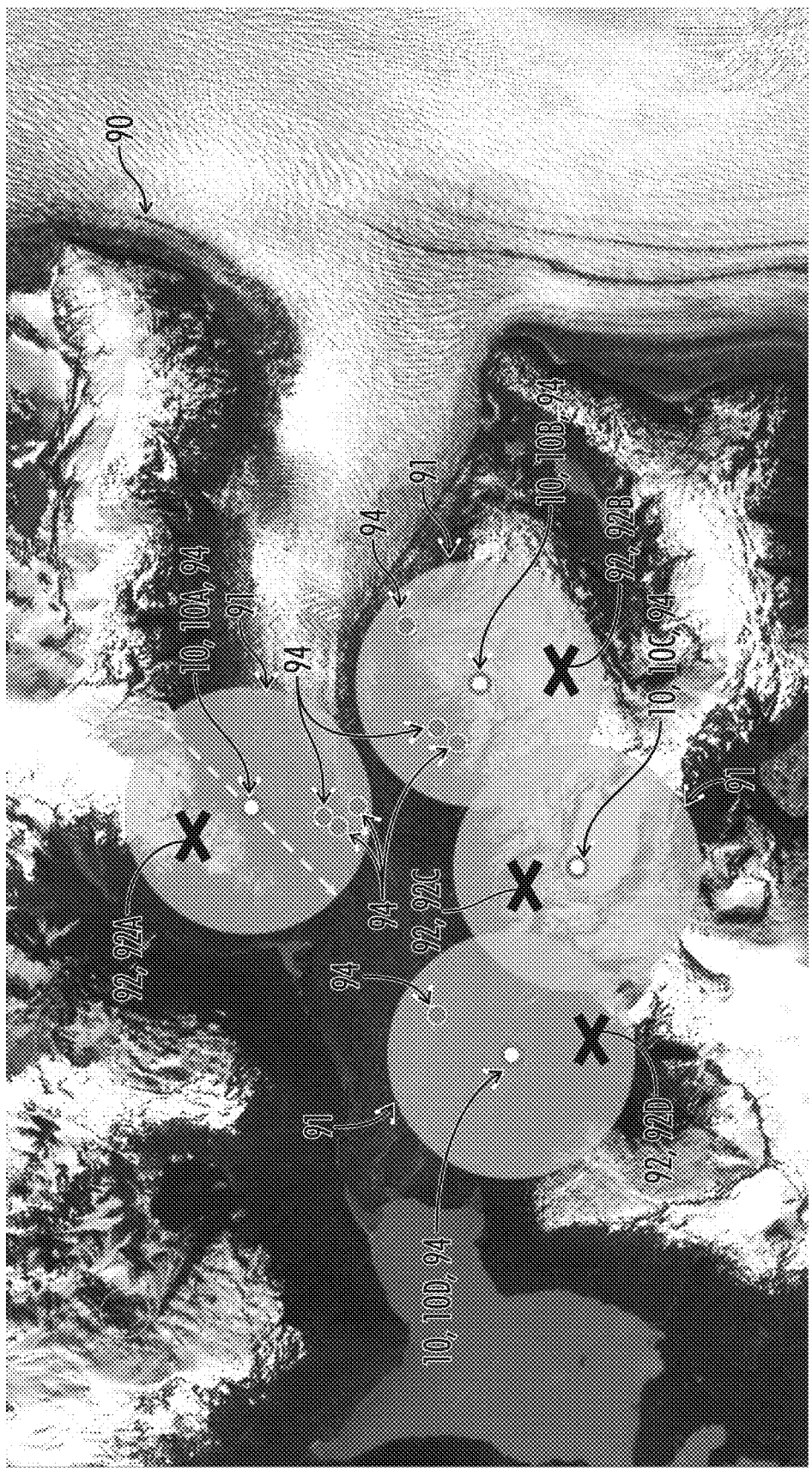
FIG. 8 illustrates an exemplary embodiment of a mission environment, wherein there are one or more targetable assets and one or more non-targetable assets identified by the system for executing a mission for at least one mobile munition assembly, in accordance with aspects of the present disclosure.
Figure 9:
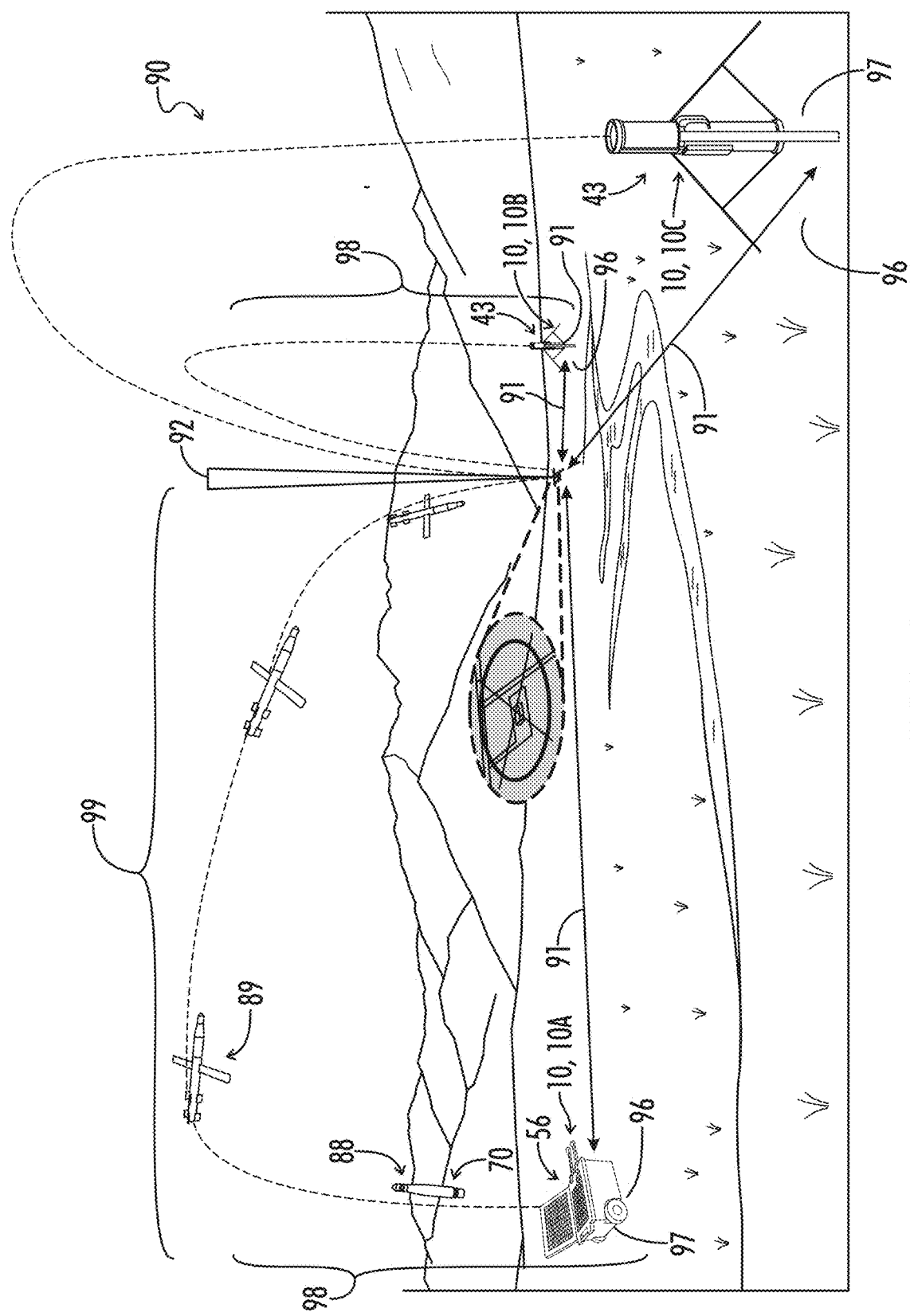
FIG. 9 illustrates an exemplary embodiment of a mission environment, wherein there are more than one of at least one mobile munition assembly, and a targetable asset has been identified by the system for executing a mission for that at least one mobile munition assembly, in accordance with aspects of the present disclosure.

As depicted in FIGS. 1A-1D, the system 100 may comprise the one or more electronic devices 110 communicatively coupled to, and in association with, one another in a given area, such as the mission environment 90 (as exemplarily illustrated in FIGS. 8-9). Within the secure network 102, the one or more electronic devices 110 of the system 100 may function in accordance with the method 200, as depicted in FIG. 5 and as discussed further herein, either alone (e.g., independently), or in concert with one another, such that the one or more electronic devices 110 of the system 100 may function as decentralized or distributed nodes in the secure network 102. Where the one or more electronic devices 110 act in concert with one another, each of the one or more electronic devices 110 may act as nodes to relay, transmit, and/or exchange communications, inputs (e.g., mission parameters), or data among the one or more electronic devices 110 in the system 100. As shown in FIGS. 1A-1D, directional arrows convey the communicative couplings, and associations, of the one or more electronic devices 110 of the system 100, wherein at least one of the one or more electronic devices 110 is associated with one or more of the at least one mobile munition assembly 10. In optional embodiments of the system 100, each of the one or more electronic devices 110 may be communicatively coupled to, and in association with, one another, as well as the administrator 104. The administrator 104 may comprise another network of devices, such as another of the secure network 102, or the administrator 104 may include a master administrator with one or more slave administrators, wherein each of the master administrator or the one or more slave administrators may be communicatively coupled to, and in association with, the one or more electronic devices 110. In other optional embodiments, the secure network 102 may comprise a mobile ad-hoc network (MANET) or a wireless mesh network (WMN). In embodiments where the secure network 102 comprises a mobile ad-hoc network (MANET) or a wireless mesh network (WMN), the one or more electronic devices 110 may be communicatively coupled to, and in association with, one another based upon geographical or physical proximity within the mission environment 90. Other of the one or more electronic devices 110, one of which may be associated with one or more of the at least one mobile munition assembly 10, may be recruited or accepted by the secure network 102 when the one or more electronic devices 110 are moved within a geographical proximity or physical range of the then-existing secure network 102 of the one or more electronic devices 110.

Figure 2A:
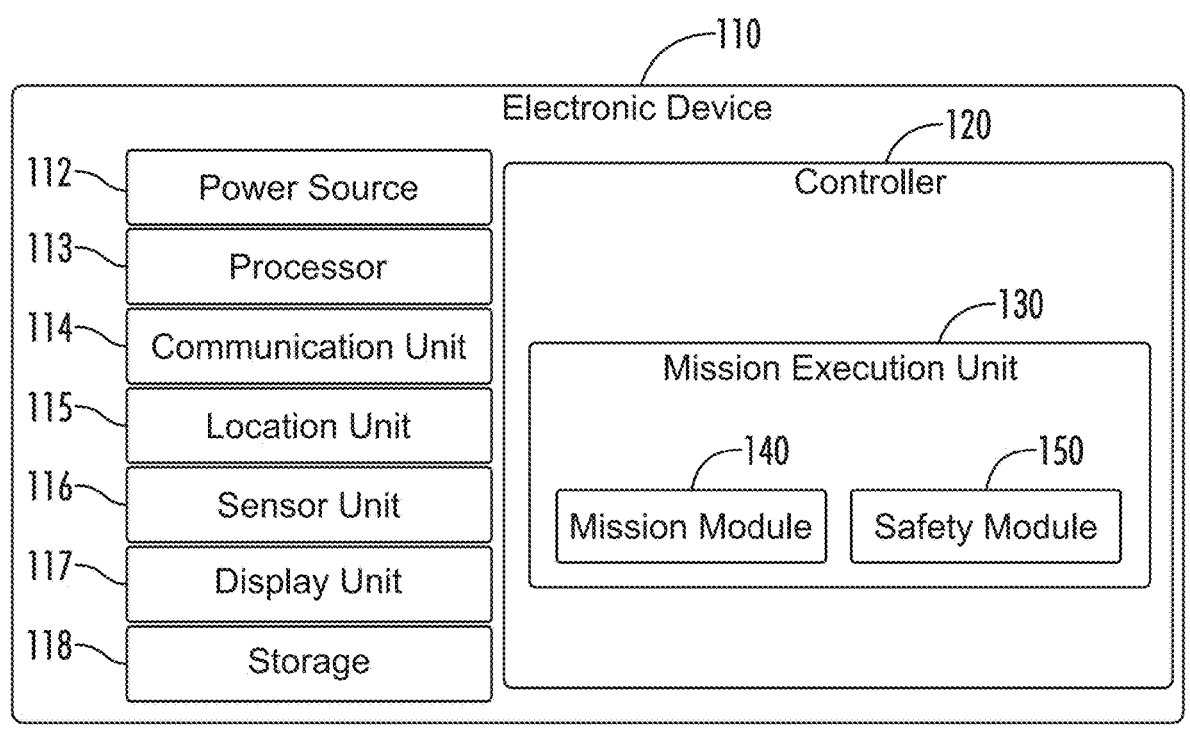
FIG. 2A illustrates an exemplary embodiment of a partial block diagram of an electronic device, in accordance with aspects of the present disclosure.
Figure 2B:
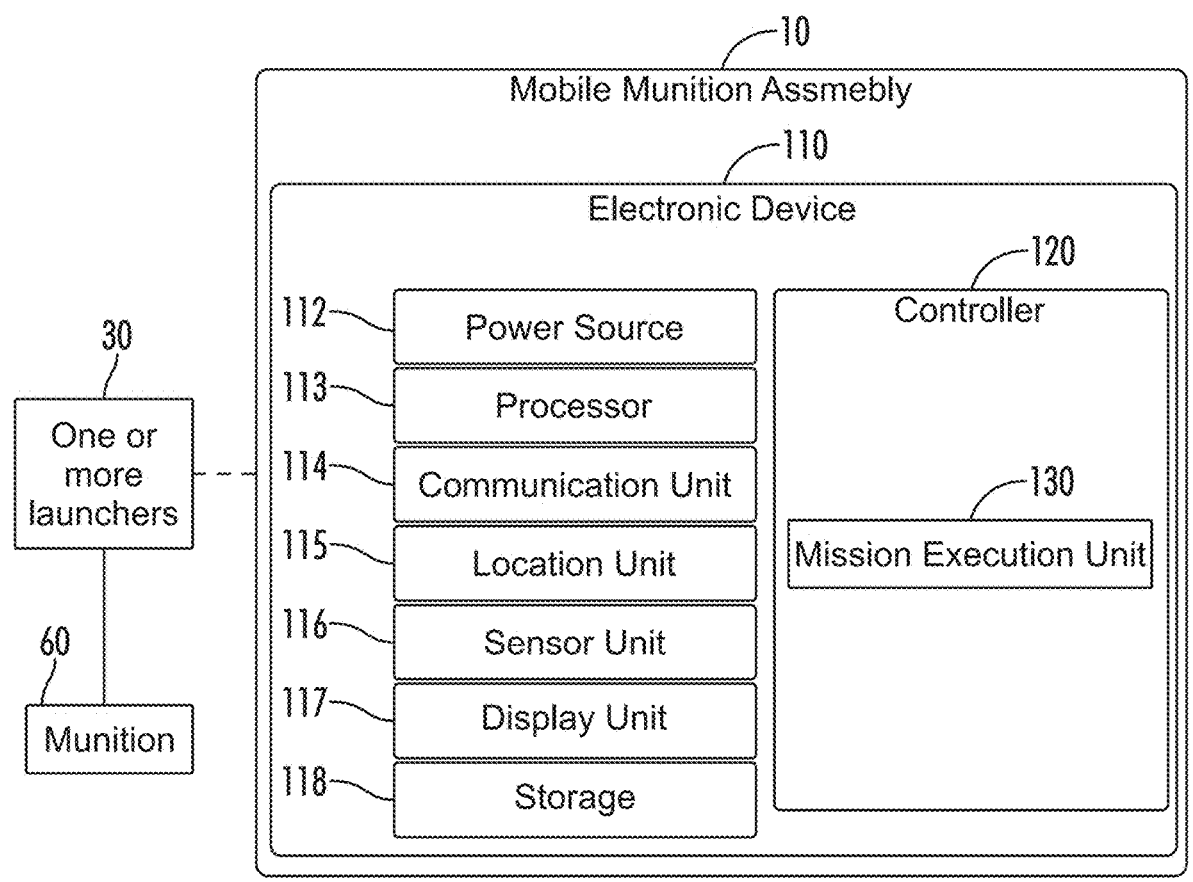
FIG. 2B illustrates an exemplary embodiment of a partial block diagram of the electronic device in association with a mobile munition assembly, in accordance with aspects of the present disclosure.

FIGS. 2A-2B depict an exemplary embodiment of the electronic device 110, wherein one of the one or more electronic devices 110 may be associated with at least one mobile munition assembly 10 having one or more launchers 30 configured to launch the munition 70. Any of the one or more electronic devices 110 may be lightweight, portable, and/or rugged, and may preferably be a hand-held computer, such as a personal data assistant (PDA), cellular phone, or a smart cellular device, including a smart cellular device or portable computer employing an Android-based operating system (OS), an Apple-based OS, or a Linux-based OS. In optional embodiments, any of the one or more electronic devices 110 may be portable laptop computer, or a notebook- or tablet-type computer. The one or more electronic devices 110 may include one or more of a power source 112, a processor 113, a communication unit 114, a location unit 115, a sensor unit 116, the display unit 117, a storage (or a storage medium) 118, and a controller 120 configured to execute a mission execution unit 130. The power source 112, which drives operability of the one or more electronic devices 110, may include at least one of a modular battery, a battery backup, an uninterrupted power supply (UPS), or any battery commercially provided in connection with a smart cellular device or portable computer employing an Apple-based OS, an Android-based OS, or a Linux-based OS, or the like. The processor 113 may be a generic hardware processor, a special-purpose hardware processor, or a combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein, e.g., the method 200, for providing a specific operation or result. It should be appreciated that the processor 113 may be any type of hardware and/or software processor and is not strictly limited to a microprocessor or any operation(s) only capable of execution by a microprocessor, in whole or in part.

The communication unit 114 of the one or more electronic devices 110 may be configured to permit communication—for example via the secure network 102, as depicted in FIGS. 1A-1D—by a wired interface, wireless interface, or a combination thereof. In optional embodiments, the communication unit 114 may include wireless communication components, such as cellular modem, radio waves, Wi-Fi, or Bluetooth, and combinations thereof. In other embodiments, the communication unit 114 may include a transceiver (not shown), or other two-way radio, which may be functionally linked to the controller 120, the transceiver (not shown) configured to send and receive communications vis-à-vis radio waves, such as among the one or more electronic devices 110 or between the one or more electronic devices 110 and a communication section (not shown) associated with the one or more launchers 30 of the at least one mobile munition assembly 10. In optional embodiments, the transceiver (not shown), or the two-way radio, may be a single channel ground/airborne radio system (SINCGARS) or advanced systems improvement program (ASIP) radio with external antenna. The communication unit 114 may enable the one or more electronic devices 110 to communicatively couple to, and associate with, one another, or in optional embodiments, the administrator 104. The communication unit 114 may also be functionally communicable with other aspects of the one or more electronic devices 110, including the location unit 115 and the sensor unit 116. In optional embodiments, the communication unit 114 of the one or more electronic devices 110 may include a radio-frequency (RF) unit, which may comprise an antenna configured to transmit single- or multi-directional signals to other RF units in the communication unit 114 of the other of the one or more electronic devices 110.

The location unit 115 of the one or more electronic devices 110 may include a global positioning system (GPS) unit (not shown), the GPS unit (not shown) configured to provide location data of the one or more electronic devices 110 or the at least one mobile munition assembly 10, wherein one of the one or more electronic devices 10 is associated therewith. Such location data may correspond to position location information (PLI) of the one or more electronic devices 110, particularly the PLI of the one or more electronic devices 110 in the mission environment 90. The sensor unit 116 of the one or more electronic devices 110 may comprise a number of sensors, such as inertial measurement units (IMUs). In optional embodiments, the IMUS may include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field. In optional embodiments, directional data provided by the location unit 115, or position-based data provided by the sensor unit 116, may be merged (or otherwise used in combination) by the controller 120 to ascertain a location or motion of the one or more electronic devices 110 (and any of the at least one mobile munition assembly 10 associated therewith) in the mission environment 90.

The one or more electronic devices 10 may store one or more sets of instructions, including instructions corresponding to the method 200, in the storage 118, which may be either volatile or non-volatile. The one or more sets of instructions, including instructions corresponding to the method 200, may be configured to be executed by the processor 113 to perform at least one operation corresponding to the one or more sets of instructions. The one or more electronic devices 110 may also have a display unit 117 as part of a user interface (UI), which may include one or more UI tools, such as a keyboard, keypad, joystick, toggle, touchscreen, or other tool, which are configured to enable input of instructions to the controller 120, including parameters of the mission, as further described herein.

The one or more electronic devices 110 may comprise a standalone device (as described previously) or may be used with at least one external component, such as another of the one or more electronic devices 110 or the administrator 104, either locally or remotely communicatively couplable with the one or more electronic devices 110—for example via the secure network 102, as depicted in FIGS. 1A-1D. The one or more electronic devices 110 may be configured to store, access, or provide at least a portion of information usable to permit one or more operations described herein, including operations set forth in the method 200, and as illustratively conveyed in FIGS. 5-7. Alternatively, or in addition, the one or more electronic devices 110 may be configured to store content data and/or metadata to enable one or more operations described herein.

Figure 3A:
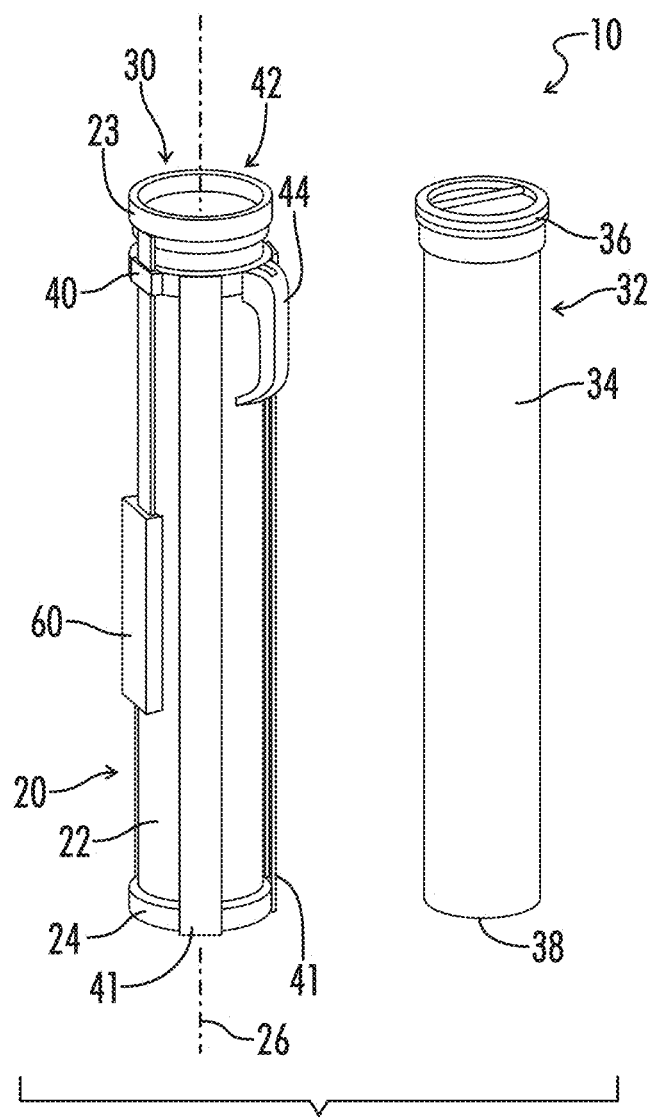
FIGS. 3A-3B illustrate perspective views of an exemplary embodiment of a mobile munition assembly, where a stabilizer is operated in a first configuration and a second configuration, in accordance with aspects of the present disclosure.
Figure 3B:
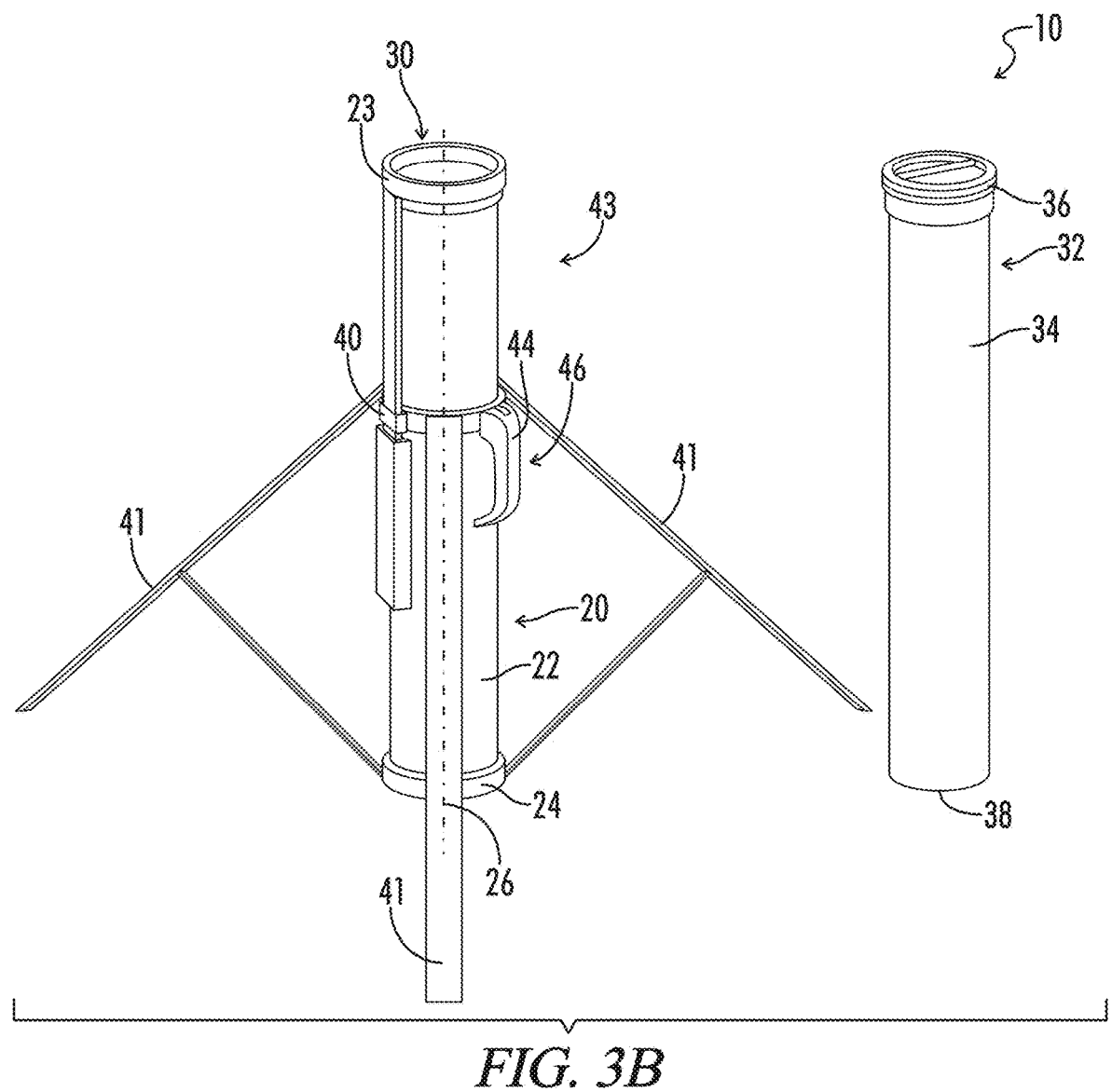

FIGS. 3A-3B illustrate perspective views of an exemplary embodiment of the mobile munition assembly 10. The mobile munition assembly 10 may have a container 20 and a stabilizer 40. A container frame 22 of the container 20, which generally defines an exterior of the container 20, may have a first end 23 distally located from a second end 24. The container 20 may have a length defined from the first end 23 to the second end 24 of the container frame 22, the length ranging up to about sixty (60) inches, though in other embodiments the length may be greater than the foregoing. The container 20 may be formed by a material including at least one of steel, aluminum, titanium, nickel, and other metals and metallic alloys, as well as composite-based or polymer-based materials, including fiber reinforced plastic (FRP), polyvinyl chloride (PVC), and combinations thereof. The container frame 22 may enclose one or more launchers 30. Each of the one or more launchers 30 may be configured to receive a munition receptacle 32. In optional embodiments, the mobile munition assembly 10 may include or otherwise have one or more of the container 20 with a corresponding one or more of the container frame 22.

Figure 4:
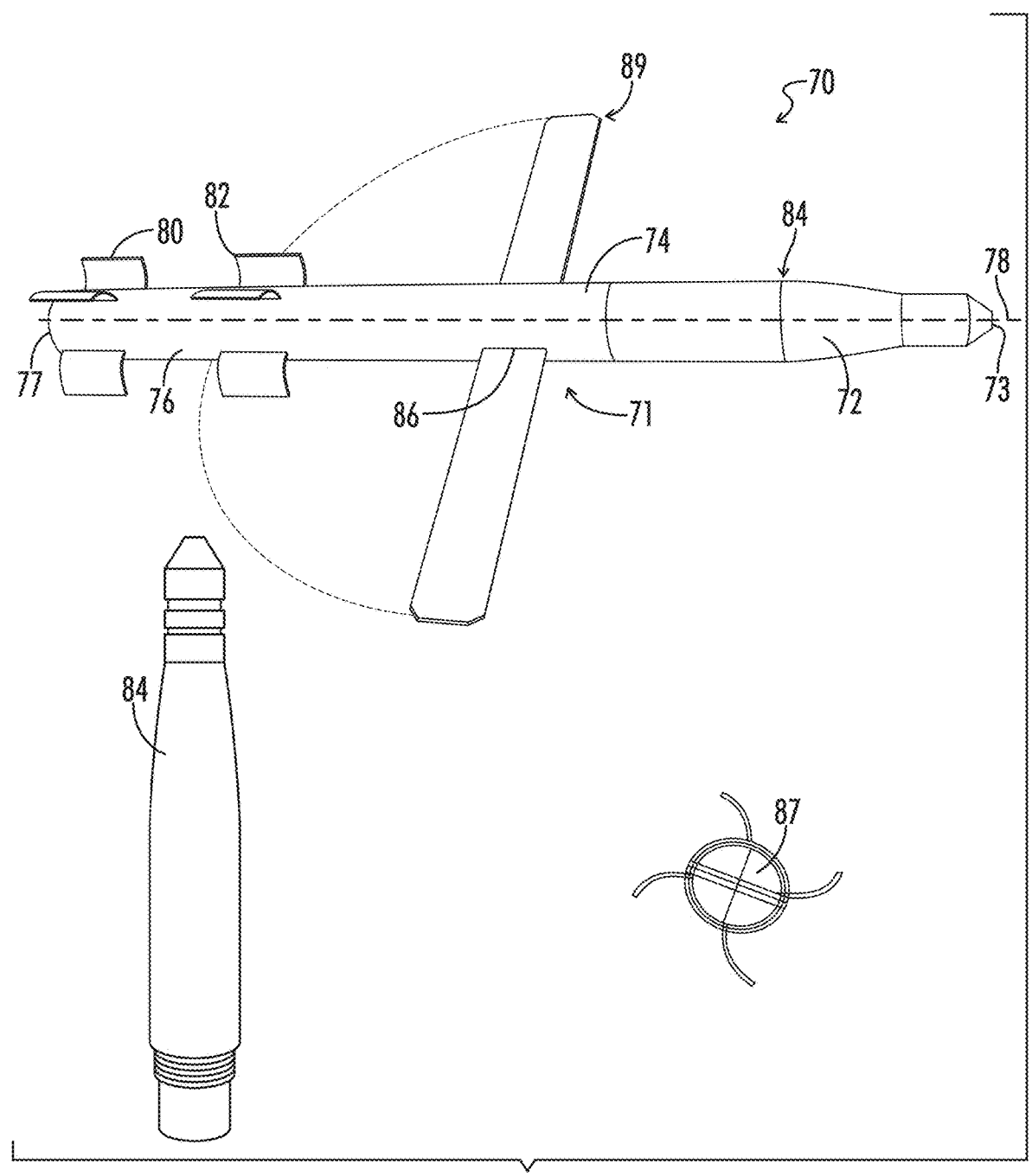
FIG. 4 illustrates a perspective view of an exemplary embodiment of a munition, in accordance with aspects of the present disclosure.

The munition receptacle 32 may be capable of receiving the munition 70, as illustratively conveyed in FIG. 4. The munition receptacle 32 may be formed by a material including at least one of a high-pressure laminate, high-pressure laminate with a phenolic resin formulation or other flame-retardant additive, steel, such as managing or stainless steel, aluminum, titanium, or other metals and metallic alloys, as well as composite-based or polymer-based materials, or other pyrotechnic materials, and combinations thereof. In optional embodiments, the munition receptacle 32 may include a receptacle frame 34. The receptacle frame 34 may have a top end 36 and a bottom end 38, the top end 36 distally located from the bottom end 38. The top end 36 may correspond to the first end 23 of the container frame 22 and the bottom end 38 may correspond to the second end 24 of the container frame 22. The receptacle frame 34 may taper beginning from the top end 36 to the bottom end 38, thereby rendering the receptacle frame 34 seamlessly and/or slidably removable from the container 20. In further optional embodiments, one or more receptacle holes (not shown) may be disposed on about the receptacle frame 34 and corresponding to one or more container holes (not shown) disposed on and about the container frame 22. Each of the corresponding one or more receptacle holes (not shown) and the one or more container holes may receive a threaded fastener (not shown) to secure the container 20 to the munition receptacle 32.

In other embodiments of the munition receptacle 32, the munition receptable 32 may have a receptacle handle (not shown) supported from the receptacle frame 34. The receptacle handle (not shown) may be pivotable between a collapsed position and an extended position. In the extended position, the receptacle handle (not shown) may be pivoted away from the receptacle frame 34; and, in the collapsed position, the receptacle handle (not shown) may be folded up adjacent to the receptacle frame 34. In optional embodiments, a hinge may be configured to allow pivotable movement of the receptacle handle (not shown) relative to the receptacle frame 34. In further optional embodiments, a spring (not shown) may be configured to bias the receptacle handle (not shown) to the extended position.

Referring to FIGS. 3A-3B, the stabilizer 40 may be supported from the container frame 22. The stabilizer 40 may include a plurality of pivotable legs 41. The stabilizer 40 may be operable between a first configuration 42 and a second configuration 43. In the first configuration 42, the plurality of pivotable legs 41 may be folded up adjacent to the container frame 22; and, in the second configuration 43, the plurality of pivotable legs 41 may be pivoted away from the container frame 22. Where the stabilizer 40 is operated to the second configuration 43, the container 20 may be placed in an upright position, such that an axis 26 from the first end 23 to the second end 24 of the container frame 22 may be generally orthogonal to a surface 97 of a launch terrain 96, as illustratively conveyed in FIGS. 8-9. In optional embodiments, where the stabilizer 40 is operated to the second configuration 43, the container may be placed in a semi-upright position, such that the axis 26 from the first end 23 to the second end 24 may form an angle relative to the surface 97 of the launch terrain 96, ranging from between about 30 degrees to 90 degrees. By placing the container 20 generally orthogonal to the surface 97 of the launch terrain 96, however, the mobile munition assembly 10 need not be positioned or displaced at an angle relative to the surface 97 of the launch terrain 96, thereby increasing the speed and efficiency in a deployment of the mobile munition assembly 10. The launch terrain 96 may include any number of environmental or geographical terrains, lands, grounds, or landscapes, as well as any artificial or man-made structure, including vehicles or heavy equipment or machinery.

Referring to FIGS. 3A-3B, a stabilizer handle 44 may be attached to the stabilizer 40. The stabilizer handle 44 may be configured to operate the stabilizer 40 between the first configuration 42 and the second configuration 43. The stabilizer 40 may be operated to the first configuration 44 by moving the stabilizer handle 44 proximate to the first end 23 of the container frame 22. The stabilizer 40 may be operated to the second configuration 43 by moving the stabilizer handle 44 to an intermediate location 46 between the first end 23 and the second end 24 of the container frame 22. In optional embodiments, the intermediate location 46 of the stabilizer handle 44 may be generally equidistant from the first end 23 to the second end 24 of the container frame 22.

Figure 3C:
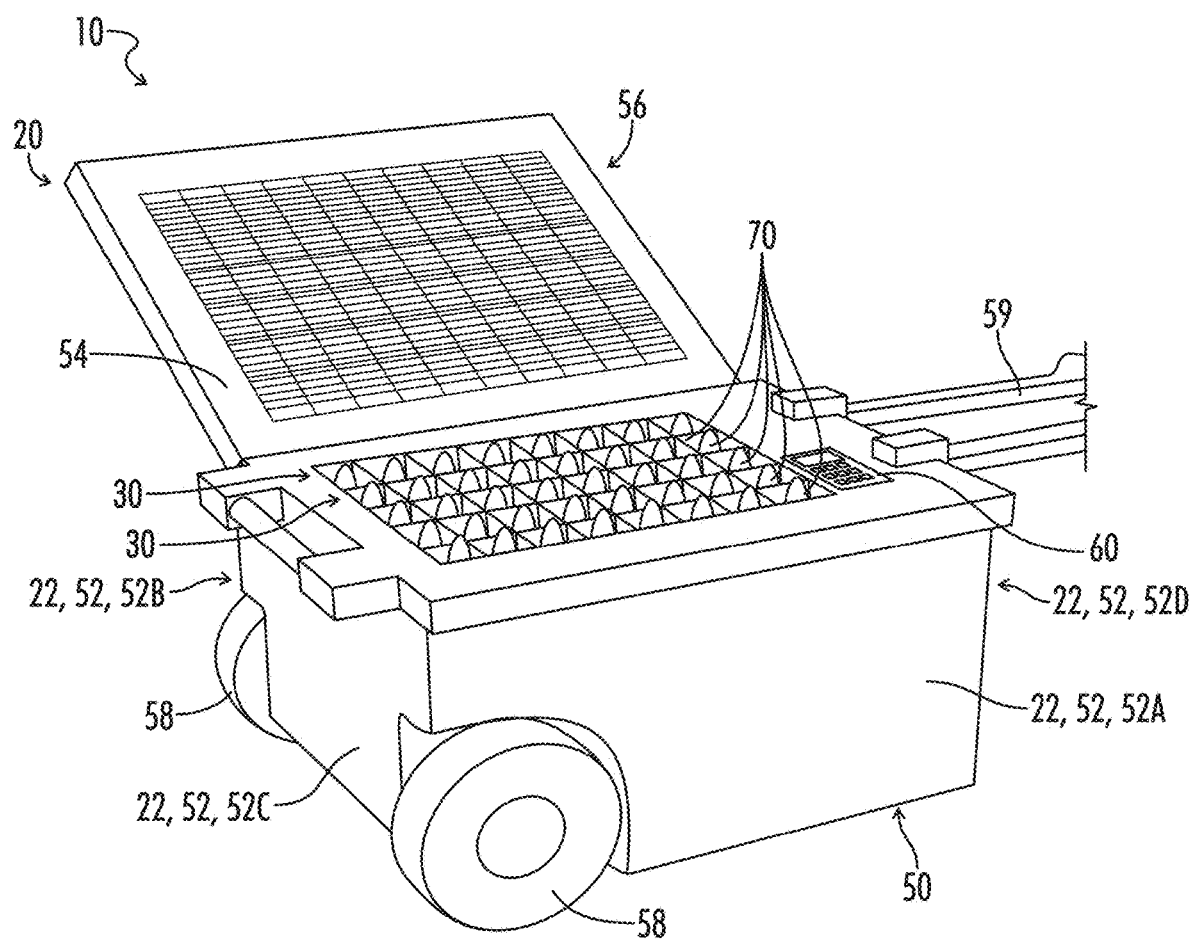
FIG. 3C illustrates a perspective view of another embodiment of the mobile munition assembly, wherein a lid of a container is operated in an open configuration, in accordance with aspects of the present disclosure.

FIG. 3C illustrates a perspective view of another embodiment of the mobile munition assembly 10. In this embodiment, the mobile munition assembly 10 may include the container 22, the container 22 of which includes peripheral walls 52—such as a front peripheral wall 52A, a back peripheral wall 52B, a left peripheral wall 52C, and a right peripheral wall 52D—a bottom 50, and a lid 54. The peripheral walls 52 may extend from the bottom 50 to define an interior of the mobile munition assembly 10—the peripheral walls 52 defining the container frame 22 in this embodiment. The one or more launchers 30 may be housed within the container frame 22, where the one or more launchers 30 are capable of receiving one or more munition 70. The lid 54 may be movable between a collapsed configuration (not depicted), wherein the lid 54 is engaged against the peripheral walls 52 to otherwise seal the interior of the container frame 22, and an open configuration 56, wherein the lid 54 is pivoted away from the peripheral walls 52 to expose the one or more launchers 30 (and the one or more munitions 70 received therein). Supported from the peripheral walls 52 and/or the bottom 50 may be one or more track units 58, such as wheels, crawlers, or other units, capable of moving the mobile unition assembly 10 across the surface 97 of the launch terrain 96. The mobile munition assembly 10 may be movable across the surface 97 of the launch terrain 96 where a user grabs or grips a handle 59 attached to the peripheral wall 52, which may be used in conjunction with the track units 58 to portably move the munition assembly 10 across the mission environment 90. When placed atop the surface 97 of the launch terrain 96, the container 22 may be configured in an upright position, such that an axis defined through each of the munition 70 received in the one or more launchers 30 (or an axis defined through each of the one or more munition receptacles 30 (not depicted) disposed within the container frame 22) may be generally orthogonal to the surface 97 of the launch terrain 96, thereby enabling a vertical launch of the munition 70 from the surface 97.

In optional embodiments, the one or more launchers 30 of the at least on mobile munition system 10, in association with at least one of the one or more electronic devices 110, may include a controller (not shown) as part of a launcher device 60, as illustratively conveyed in FIGS. 3A-3C. The controller (not shown) may be associated with a processor (not shown), a computer readable medium (not shown), a data storage (not shown), and in optional embodiments a user interface (not shown) having a display (not shown). In other optional embodiments, an input/output device (not shown), such as a keyboard, keypad, touchscreen, joystick, or other user interface tool, is provided so that a human user may input instructions to the controller (not shown) of the one or more launchers 30. A communication unit (not shown) of the controller (not shown) of the one or more launchers 30 may support or provide communications between the controller (not shown) of the one or more launchers 30 and the one or more communication unit 114 of the one or more electronic devices 110. The communication unit (not shown) of the one or more launchers 30 may also a location unit (not shown) having a global positioning system (GPS) unit with an antenna, wherein the GPS unit may be configured to provide location data of the at least one mobile munition assembly 10 in the mission environment 90. An example of the GPS unit or receiver may be a defense advanced global positioning system receive (DAGR) with the antenna. The communication unit (not shown) of the one or more launchers 30, on the launcher device 60, may also include a transceiver (not depicted), or other two-way radio, which may be configured to send and receive communications vis-à-vis radio waves from other of the one or more launchers 30 or the one or more electronic devices 110. In optional embodiments, the transceiver (not shown) or the two-way radio, may be a single channel ground/airborne radio system (SINCGARS) or advanced systems improvement program (ASIP) radio with external antenna. Moreover, the one or more launchers 30 may be driven by a power supply (not shown), which may include at least one of a modular battery, a solar panel, a battery backup, an uninterrupted, power supply (UPS), or any combination thereof.

The controller (not shown) of the one or more launchers 30, through a central processing unit (not shown), may process data received from sensor units (not shown) associated within the one or more launchers 30, such as inertial measurement units (IMUs). The IMUs may be configured to provide output signals as to the relative position, velocity, and orientation of the one or more launchers 30, and by extension the container 20 of the mobile munition assembly 10. The IMUs may be associated with the controller (not shown) of the one or more launchers 30, wherein the output signals are processed and conveyed on a display (not shown) to show and demonstrate the relative position, velocity, and orientation of the container 20 enclosing the one or more launchers 30. The central processing unit (not shown) may also process data received from various sensors positioned within or located within the one or more launchers 30 and/or the munition receptacle 32, the sensors of which may be configured to detect a loading of the munition 70 into the munition receptacle 32 or an inserting of the munition receptacle 32 into at least one of the one or more launchers 30. The controller (not shown) may further process data received from motion-detection sensors (not shown) disposed on or about the container frame 22, the motion-detection sensors (not shown) of which may flag, signal, or indicate a physical presence or geographical proximity of a user of the mobile munition assembly 10, third-party persons, or heavy equipment or machinery, such as vehicles. The controller (not shown) may receive output signals on motion within a radius of about up to about twenty-five (25) meters from the motion-detection sensors (not shown), through the radius may be greater or lesser.

Referring to FIG. 4, an exemplary embodiment of the munition 70 is illustratively conveyed. The munition 70 may be propelled out of the munition receptacle 32 in which the munition 70 is loaded and from one of the one or more launchers 30 in which the munition receptacle 32 is inserted. The munition 70 may be propelled by an impulse or reaction. In optional embodiments, the munition 70 may be ejected by an expansion of high-pressure gases from a compressed air supply or from an ignition of a propellant charge. In other optional embodiments, the munition 70 may be launched from the one or more launchers 30 through activation and combustion of a motor (not shown) housed within a munition frame 71 of the munition 70. In further optional embodiments, the munition 70 may be an indirect-fire munition or a barrel-expelled munition. The munition 70 may be launched through activation or combustion of the motor (not shown) by a remote controller, including the controller 120 of the one or more electronic devices 110 associated with the mobile munition assembly 10 or through the controller (not shown) of the one or more launchers 30.

The munition 70 may have an exterior defined by the munition frame 71, the munition frame of which may be generally divided into at least the following sections: a nose 72, a body 74, and a tail 76. The nose 72 may be distally located from the tail 76, and the body 74 may be positioned between the nose 72 and the tail 76. The munition 70 may have a length defined from an end 73 of the nose 72 to an end 77 of the tail 76, the length ranging from about thirty-two (32) inches to about forty-eight (48) inches, though in other embodiments the length may be greater or lesser than the foregoing. Two or more fins, such as first fins 80 and second fins 82 may be supported from and/or disposed about the munition frame 71. The two or more fins may be static or controllable. For example, the first fins 80 and/or the second fins 82 may be actuated by a motor (not shown) housed within the munition frame 71. When not actuated, the first fins 80 and/or the second fins 82 may be operated to a launch configuration 88, wherein the first fins 80 and/or the second fins 82 are folded up adjacent to the munition frame 71; and when actuated, the first fins 80 and/or the second fins 82 may be operated to a flight configuration 89, wherein the first fins 80 and/or the second fins 82 may be pivoted away from the munition frame 71. In optional embodiments, the first fins 80 may be static or controllable fins supported from and/or disposed about the munition frame 71 at the end 77 of the tail 76, and the first fins 80 may be articulated with respect to an axis 78 defined along the munition 70 from the end 77 to the end 73. In other optional embodiments, the second fins 82 may be static or controllable fins supported from and/or disposed about the munition frame 71 at a location on the body 74 proximate to the tail 76, and the second fins 72 may be articulated with respect to the axis 78. Two or more wings 86 may be supported and/or disposed about from the munition frame 71 on a location on the body 74 proximate to the nose 72. The two or more wings 86 may be operable between a launch configuration 88 and a flight configuration 89, as illustratively conveyed in FIGS. 4 and 9. In the launch configuration 88, the two or more wings 86 may be folded up adjacent to the munition frame 71. In the flight configuration 89, the two or more wings 86 may be pivoted away from the munition frame 71. Where the two or more wings 86 are operated to the flight configuration 89, the two or more wings 86 may be perpendicular to the axis 78.

A warhead 84, a guidance system 87, and a fuze (not shown) may be housed within the munition frame 71, including at a location within the munition frame 71 at the nose 72. The fuze (not shown) may be initiated to cause detonation of the munition 70 upon impact, in proximity, by time delay, or remotely (such as by and through the one or more electronic devices 110). In optional embodiments, the warhead 84 may have a length ranging from about ten (10) inches about twenty (20) inches, though the length may be greater or lesser. In other optional embodiments, the warhead 84 may have a weight between about eight (8) pounds and fifteen (15) pounds, though the weight may be greater or lesser. In further optional embodiments, the warhead 84 may constitute any one of the following warheads: M151, M156, M229, M247, M255, M255E1/A1, M257, M259, M261, M264, M267, M274, M278, M282, M229, WTU-1/B, WDU-4/A, or WDU-4A/A, or other warheads, including those configured to provide surface-to-air or surface-to-surface capability. In yet further optional embodiments, the warhead 84 may be comprise any warhead having a threaded interface that allows for interchangeability with the one or more launchers 30 and/or the munition receptacle 32 of the at least one mobile munition assembly 10. Where the munition 70 is loaded into the munition receptacle 32, and is thereby inserted into the container 20, a total weight of the container 20, the munition receptacle 32, and the munition 70 (including the warhead 84 therein) may range up to about fifty (50) pounds, though in other embodiments the total weight may be greater than the foregoing.

The guidance system 87 of the munition 70 may include global positioning system (GPS) navigation or inertial guidance system (IGS) navigation. The GPS may determine a location of the munition 70 during a flight path 99 of the munition 70, the flight path 99 of which is illustratively conveyed in FIG. 9. GPS preferably comprises an antenna (not shown) and a processor (not shown), the processor of which provides position- and velocity-based data and analytics for suitable navigational coordinates. The GPS, which is associated with a data interface of a controller (not shown) for receiving from an external source, such as a satellite, location data pertaining to the mission environment 90 and one or more targetable assets 92, may calculate expected relative location data of the munition 70 with respect to the one or more targetable assets 92 within the mission environment 90.

In other embodiments of the munition 70, the IGS of the guidance system 87 may include one or more inertial measurement units (IMUs). IMUs may include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field. Generally, an accelerometer provides measurements, with respect to (among other things) force due to gravity, while a gyroscope provides measurements, with respect to (among other things) rigid body motion. The magnetometer provides measurements of the strength and the direction of the magnetic field, with respect to (among other things) known internal constants, or with respect to a known, accurately measured magnetic field. The magnetometer provides measurements of a magnetic field to yield information on positional, or angular, orientation of the IMU; similar to that of the magnetometer, the gyroscope yields information on a positional, or angular, orientation of the IMU. Accordingly, the magnetometer may be used in lieu of the gyroscope, or in combination with the gyroscope, and complementary to the accelerometer, in order to produce local information and coordinates on the position, motion, and orientation of the IMU. Principally, the IMU may provide kinematic- or position-based data, including position, velocity, yaw, pitch, and roll. In optional embodiments, the IMU may constitute a micro electro-mechanical system (MEMS) in which the gyroscope and the accelerometer provide accurate information on attitude, azimuth, relative position, and velocity of the munition 70 during a trajectory or an altitude 98 of a launch of the munition 70 or the flight path 99 of the munition 70 in the mission environment 90.

Within the guidance system 87 of the munition 70, a processing and control unit, such as a munition avionics processor (not shown), may be configured to process the data received from the IMU or the GPS to determine or estimate a location and orientation of the munition 70 in the mission environment 90. The processing and control unit (not shown) of the guidance system 87 may be further configured to control the erection of the two or more wings 86, the first fins 80, and/or the second fins 82, during the flight configuration 89. Such erection of the two or more wings 86 during the flight configuration 89 may be actuated by the motor (not shown) housed within the munition frame 71. In optional embodiments, the motor (not shown) may be electrically driven. The guidance system 87 may receive a requisite voltage to operate the motor (not shown) from a power source (not shown) and the processing and control unit (not shown) of the munition 70. The processing and control unit (not shown) of the munition 70 may include a communication unit (not shown), configured to provide wireless communication between the processing control unit (not shown) of the munition 70 and the controller of the one or more launchers 30 or one of the one or more electronic devices 110.

FIG. 5 illustrates a flowchart providing an exemplary embodiment of the method 200 of executing a mission for the at least one mobile munition assembly 10, in accordance with aspects of the present disclosure. The method 200 may commence with an operation 202 of deploying at least one mobile munition assembly 10 in the mission environment 90. The stabilizer 40 may be operated from the first configuration 42 to the second configuration 43, wherein the plurality of legs 41 are pivoted away from the container frame 22 of the container 20. The second configuration 43 may place the container 20 in the upright position, such that the axis 26 defined along the container frame 22 from the first end 23 to the second end 24 is generally orthogonal to the surface 97 of the launch terrain 96. Alternatively, where the stabilizer 40 is operated to the second configuration 43, the container may be placed in a semi-upright position, such that the axis 26 from the first end 23 to the second end 24 may form an angle relative to the surface 97 of the launch terrain 96, ranging from between about 30 degrees to 90 degrees. The munition 70 may be loaded into the munition receptacle 32, and the munition receptacle inserted into at least one of the one or more launchers 30 of the at least one mobile munition assembly 10.

The method 200 may continue with an operation 204 of communicatively coupling one or more electronic devices 110, by and through the communication unit 114, with one another in the mission environment 90, such that each of the one or more electronic devices 110 are in association with one another, and at least one of the one or more electronic devices 110 is associated with one or more of the at least one mobile munition assembly 10. The one or more electronic devices 110 may form, or establish, the secure network 102 when the one or more electronic devices 110 are communicatively coupled to, and in association with, one another, as illustratively conveyed in FIGS. 1A-1D. In other optional embodiments, the one or more electronic devices 110 communicatively coupled to, and in association with, one another may be recruited to the secure network 102 by another of the one or more electronic devices 110 or by a remote system, such as the administrator 104. In further optional embodiments, one or more electronic devices 110 may be communicatively connected to one another, wherein at least one of the one or more electronic devices 110 may be associated with one or more of the at least one mobile munition assembly 10. As described previously, the secure network 102 may comprise a mobile ad-hoc network (MANET) or a wireless mesh network (WMN).

Figure 7:
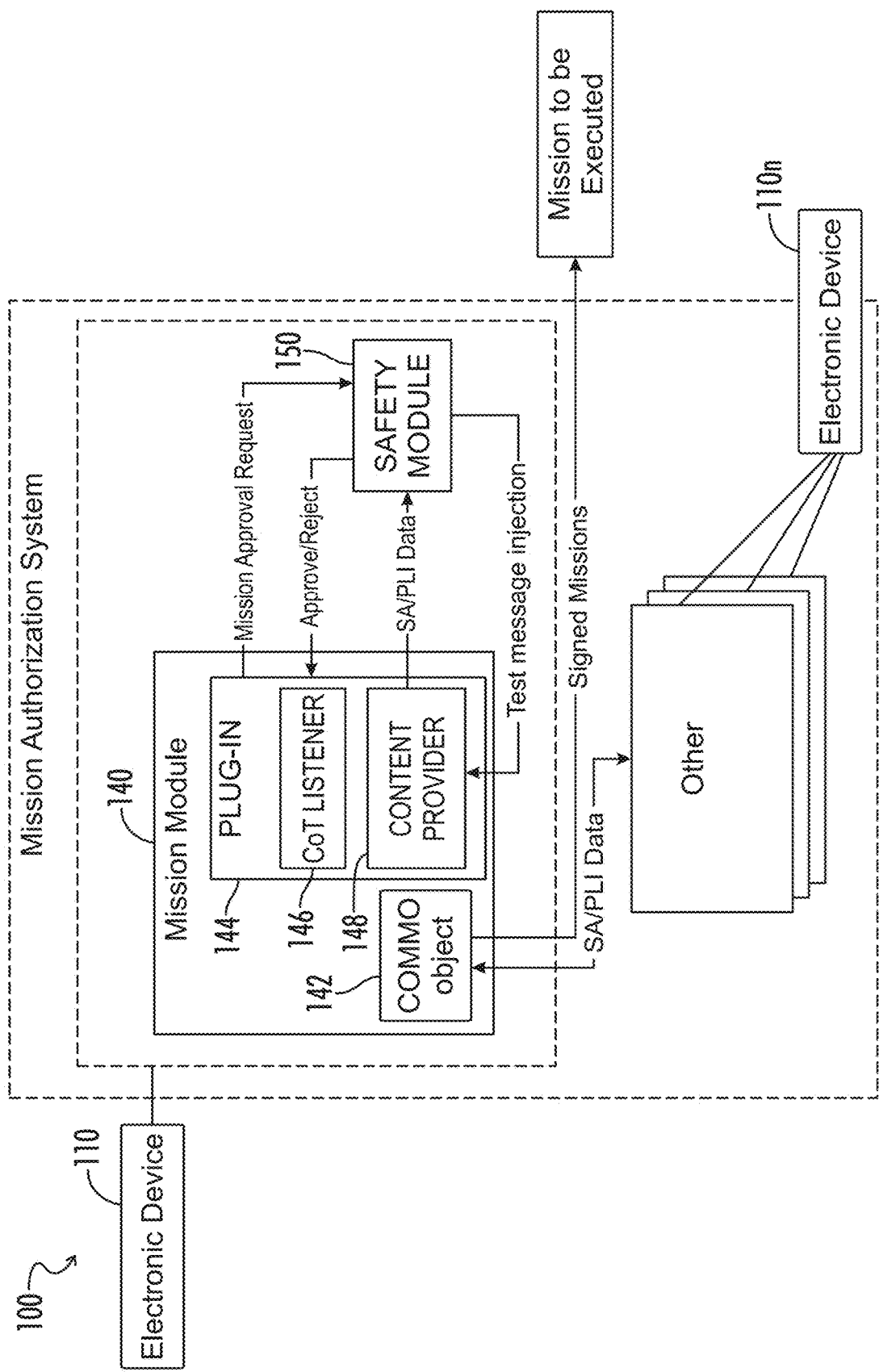
FIG. 7 illustrates another exemplary embodiment of a partial block diagram of a system for executing a mission for at least one mobile munition assembly, the system comprising one or more electronic devices having a safety module and a mission module, in accordance with aspects of the present disclosure.

The method 200 may continue with an operation 206 of transmitting at least signals representative of a situational awareness (SA) corresponding to each of the one or more electronic devices 110, including those of the one or more electronic devices 110 associated with the at least one mobile munition assembly 10. The signals representative of the situational awareness (SA) may be received and outputted by the location unit 115 and/or the sensor unit 116 to the controller 120, the location unit 115 and/or the sensor unit 161 of which may be couplable to the communication 114, as described above. For the purpose of the disclosure herein, signals representative of a situational awareness (SA) may include (without limitation) position location information (PLI) of the one or more electronic devices 110, or any directional-, position-, or movement-related information pertaining to the one or more electronic devices 110 (including those associated with the at least one mobile munition assembly 10) in the mission environment 90. Situational awareness (SA) may also encompass environmental factors or other external conditions pertaining to, or affecting, the one or more electronic devices 110, the at least one mobile munition assembly 10, and/or the mission environment 90, including any perception or monitoring of a targetable range 91, one or more targetable assets 92, one or more non-targetable assets 94, or the munition 70 (and the altitude 98 or the flight path 99 of the munition 70). Situational awareness (SA) may also include characteristics or features pertaining to the mission environment 90, including a type of the launch terrain 96 (e.g., mountainous, rocky, desert- or tundra-like, wooded, forested, hilled, etc.) and the surface 97 of the launch terrain 96. As depicted in FIG. 7, the signal representative of the situational awareness (SA) may be received, on or thorough the communication 114 of the one or more electronic devices 110, by a communication (or "COMMO") object 142 provided by the mission module 140 of the mission execution unit 130, executable by the controller 120. The COMMO object 142 may use device-specific libraries residing on the one or more electronic devices 110, for the purpose of sending the information corresponding to the situational awareness (SA) of the one or more electronic devices 110 to a plug-in 144, or other software application 144, downloadable and implementable by the one or more electronic devices 110. The plug-in 44 may include a cursor-on-target (CoT) Listener 146, the CoT Listener 146 of which may be configured to filter the information corresponding to the situational awareness (SA) of the one or more electronic devices 110 (or information corresponding to the network 102), including the one or more electronic devices 110 associated with one or more of the at least one mobile munition assembly 10.

Figure 6:
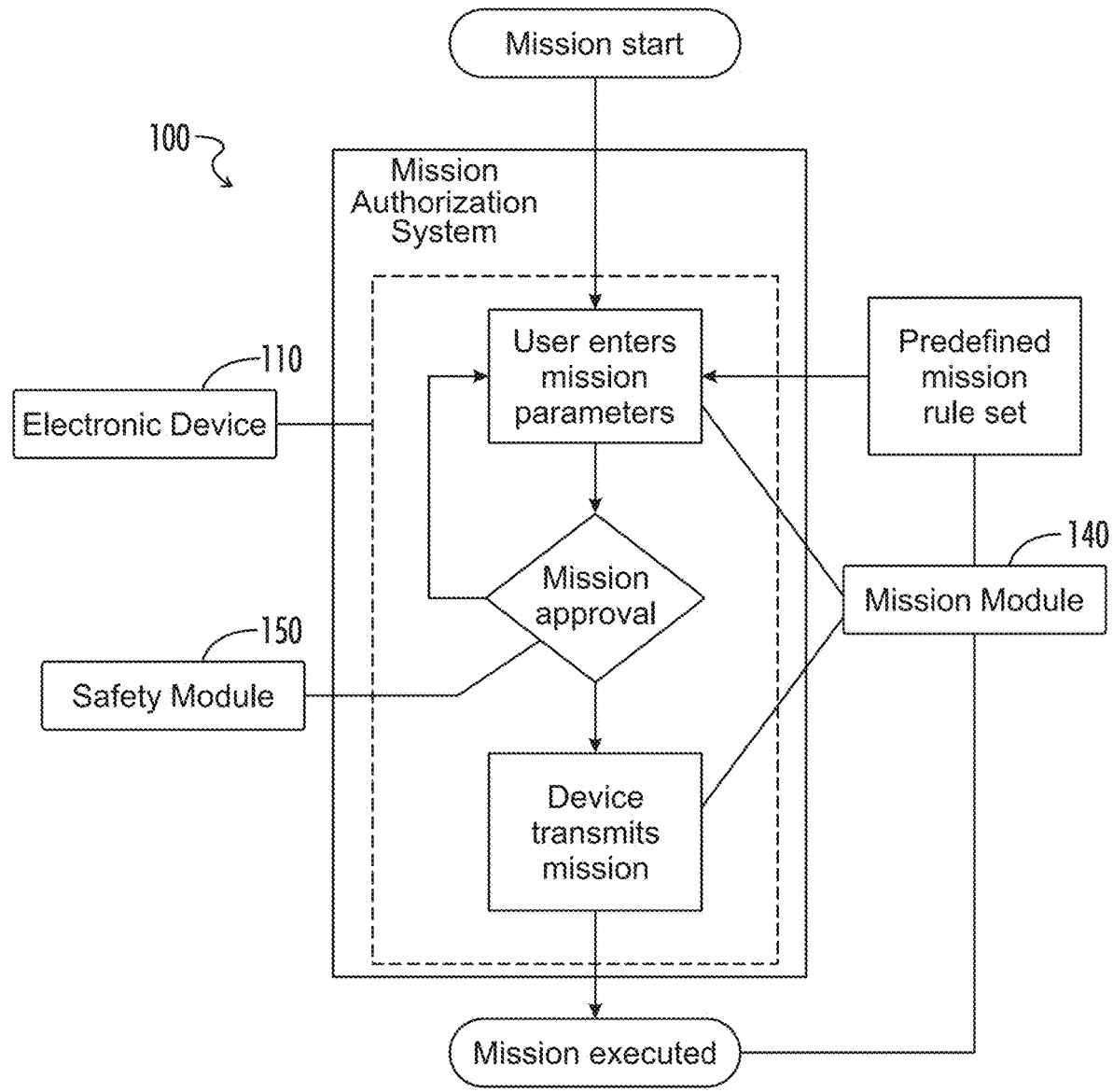
FIG. 6 illustrates an exemplary embodiment of a partial block diagram of a system for executing a mission for at least one mobile munition assembly, the system comprising one or more electronic devices having a safety module and a mission module, in accordance with aspects of the present disclosure.

The method 200 may continue with an operation 208 of enabling an input of parameters of the mission for the at least one mobile munition assembly 10. The parameters of the mission for the at least one mobile munition assembly 10 may be inputted, manually or otherwise, on the display unit 117 on at least one of the one or more electronic devices 110 vis-à-vis a user interface on the display unit 117. Accordingly, the system 100 may initiate with the entry (and receipt) of the parameters of the mission by and through the mission module 140 of the mission approval unit 130, as depicted in FIGS. 5-6. The mission module 140 of the mission approval unit 130 may be executable by the controller 120 of any one of the one or more electronic devices 110. The plug-in 144, or the other software application 144, may be configured to receive the parameters of the mission for the at least one mobile munition assembly 10, whether provided by a user of the one or more electronic devices 110, or provided by a centralized entity, such as the administrator 104. In optional embodiments, the plug-in 144 may further include a content provider 148, the content provider 148 of which may comprise a structured query language (SQL) database instantiated by the plug-in 144. The plug-in 144 may receive the parameters of the mission, as illustratively conveyed in FIG. 7, by and through the display unit 117 having the user interface (UI) associated therewith, and the content provider 148 may receive, from the CoT Listener 146, filtered information corresponding to the situational awareness (SA) of the one or more electronic devices 110. Parameters of the mission may comprise any instructions, directions, or other guidance for the at least one mobile munition assembly 10 or the munition 70 launched therefrom, including an instruction to launch the munition 70 at the one or more targetable assets 92 in the mission environment 90, as illustratively conveyed in FIGS. 8-9. Other parameters of the mission may include an instruction to select more than one of the at least one mobile munition assembly 10, the function of which is to launch a plurality of munitions 70 at the one or more targetable assets 92 from a plurality of the at least one mobile munition assembly 10 in the mission environment 90.

One or more predefined rules 210 may be related to the parameters and may be configured to be applied to the parameters of the mission based on at least the status of the situational awareness (SA). The content provider 148 of the plug-in 144 may have stored thereon one or more predefined rules 210 related to at least the parameters of the mission. The one or more predefined rules 210 may comprise a rule set that is deterministic, presented in human-readable syntax, and/or may include static or dynamic elements pertaining to the mission. In optional embodiments, the one or more predefined rules 210 may include at least one of information corresponding to at least to one of a location of the one or more electronic devices 110 in the mission environment 90, a location of the at least one mobile munition assembly 10 in the mission environment 90, an identification of one or more targetable assets 92 in the mission environment 90, an identification of one or more non-targetable assets 94 in the mission environment 90, the altitude 98 of the munition 70 when launched from the at least one mobile munition assembly 10, a trajectory of the munition 70 when launched from the at least one mobile munition assembly 10, the flight path 99 of the munition 70 when launched from the at least mobile munition assembly 10, a type of the warhead 84 located within the munition 70, an impact radius of the munition 70, or a time constraint on the mission. The one or more predefined rules 210 may also include at least one of a height, roughness, or other characteristic of the surface 97 of the launch terrain 96 provided in the mission environment 90, nominal trajectory data associated with the munition 70 launched from the at least one mobile unition assembly 10, or trajectory dispersions associated with the munition 70 launched from the at least one mobile munition assembly 10, and combinations thereof. In other embodiments, the one or more predefined rules 210 may comprise a rule set presenting criteria for which the mission for the at least one mobile munition assembly 10 is at least one of the following: safe or unsafe conditions in the mission (e.g., presence of one or more non-targetable assets 94 in the mission environment 90), too soon or too late for a duration of the mission, or too close or too far within the mission environment. In other optional embodiments, the one or more predefined rules 210 may include criteria pertaining to a proximity to third-party entities or assets, including individuals, structures, or vehicles, all of which may be classified as the non-targetable assets 94, or areas otherwise geofenced or kept out within the mission environment 90.

In further optional embodiments, the one or more predefined rules 210 may comprise preloaded data pertaining to the mission for the at least one mobile munition assembly 10, including (without limitation): latitudes, longitudes, and altitudes with respect to a common coordinate system as it pertains to the mission environment 90; the type of munition 70 to be launched from the one or more launchers 30; a propellant charge for the munition 70, as well as the type and function of the fuze for the munition 70; or a number of munitions 70 to be launched from the one or more launchers 30, an azimuth of a launch of the munition 70, or a method of control of the munition 70 subsequent to a launch and during the flight path 99; and combinations thereof, or the like. Other preloaded data pertaining the to the mission for the at least one mobile munition assembly 10 may include mission data exchanged across the secure network 102 among the one or more electronic devices 110 (including those associated with the at least one mobile munition assembly 10), including, but not limited to, command-tolaunch messages, denial-of-mission messages, end-of-mission messages, check-fire messages, cancel-check-fire messages, and other support data exchanged across the network 102 of the one or more electronic devices 110 (including those associated with the at least one mobile munition assembly 10).

Application of the one or more predefined rules 210 to the parameters of the mission based at least on the signals representative of the situational awareness (SA) corresponding to each of the one or more electronic devices 110 may be carried out by the safety module 150, which is executable by the mission approval unit 130 of the controller 120. The safety module 150 may receive, from the content provider 148 of the plug-in 144, information corresponding to the situational awareness (SA) and the parameters of the mission, as well as the one or more predefined rules 210 related to at least the parameters of the mission. The application of the one or more predefined rules 210 by the safety module 150 may ascertain or determine whether the parameters of the mission comport with limitations or instructions provided by criteria of the one or more predefined rules 210.

The method 200 may continue with an operation 212 identifying the one or more targetable assets 92 and the one or more non-targetable assets 94 in the mission environment 90 based at least on the parameters of the mission for the at least one mobile munition assembly 10 and an application of the one or more predefined rules to the parameters of the mission. In optional embodiments, identification of the one or more targetable assets 92 and the one or more non-targetable assets 94 in the mission environment 90 may be carried out or effectuated by geo-based position locating or by a user manually identifying one or more non-targetable assets 94 and the one or more targetable assets 92 in the mission environment 90; and, in other optional embodiments, the operation 212 of identifying the one or more targetable assets 92 within the mission environment may be carried out or effectuated by a laser-based rangefinder, such as FLIR's Recon V® rangefinder, where the lase-based rangefinder is configured to communicate with the one or more electronic devices 110 and provide position locator information to the one or more electronic devices 110 in the mission environment 90.

Referring to FIG. 8, the operation 212 of identifying the one or more targetable assets 92 in the mission environment 90 is illustratively depicted. The one or more targetable assets 92 may include a first targetable asset 92A, a second targetable asset 92B, a third targetable asset 92C, and a fourth targetable asset 92D. A first mobile munition assembly 10A, a second mobile munition assembly 10B, a third mobile munition assembly 10C, and a fourth mobile munition assembly 10D may be configured to identify one or more targetable assets 92 and one or more non-targetable assets 94 within a targetable range 91 corresponding to each of the at least one mobile munition assembly 10. As depicted in FIG. 8, a first of the targetable range 91 may overlap or intersect with a second of the targetable range 91 (and so forth), given the physical proximity of the at least one mobile munition assembly 10 in the mission environment 90. The targetable range 91 may have a radius ranging from about 500 meters to about 5 kilometers, the radius measured outwardly from a position of each of the at least one mobile munition assembly 10 in the mission environment 90, or otherwise defined by the flight path 99 of the munition 70. In optional embodiments, the one or more non-targetable assets 94 may include the least one mobile munition assembly 10 in the mission environment 90 and/or the one or more electronic devices 110. The one or more non-targetable assets 94 may also include human users, observers, heavy equipment or machinery, vehicles, or other undesirable areas or assets that are not intended to be targeted by one or more of the at least one mobile munition assembly 10.

The method 200 may also continue with an operation 214 of reporting whether there is a mission error 216 (or mission fault 216) detected by the one or more electronic devices 10 in the mission environment 90. The mission error 216 may be detected by sending, at periodic intervals, a plurality test messages, to detect whether there is an error or fault with the one or more electronic devices 110 in communicatively coupling to, and in association with, one another, or whether there is an error (or a fault) in the secure network 102. The safety module 150 of the mission approval unit 130, executing independently of the mission module 140 of the mission approval unit 130, allows for a detection of the mission error 216 with the one or more electronic devices 110 (including the one or more electronic devices 110 associated with at least one mobile munition assembly 10) and/or the secure network 102, as conveyed in FIG. 7. By sending, or injecting, the plurality test messages, at periodic intervals, the safety module 150 may determine the mission error 216 in any component of the mission module 140, including the communications and/or data exchanges among COMMO object 142, the plug-in 144, the CoT Listener 146, or the content provider 148, or the safety module 150 may determine other errors or faults with the one or more electronic devices 110, the at least one mobile munition assembly 10, and/or (in some embodiments) the munition 70. The plurality of test messages—otherwise referred to as cursor-on-target (CoT) schema—may be generated by the safety module 50 and transmitted to the CoT Listener 146 of the plug-in 144. The plug-in 144 may record the plurality of the test messages in the content provider 148, which is thereby read by the safety module 150. To the extent the mission error 216 is detected, such data is validated or ignored, for the purpose of otherwise reliably executing the mission for the at least one mobile munition assembly 10. To execute the mission for the at least one mobile munition assembly 10, a detection of the mission error 216 may require a consensus among the safety module 150 of each of the one or more electronic devices 110 in the secure network 102, wherein a consensus mechanism may be employed to evaluate each safety module 150 against other of the safety module 150, for the purpose of shifting decision-making to the most reliable safety module 150 among the one or more electronic devices 110.

In optional embodiments, the mission error 216 detected by the one or more electronic devices 110 may include at least one of a loss of communication, on the secure network 102, of the one or more electronic devices 110 in the mission environment 90, an uncertainty of a location of the one or more electronic devices 110 in the mission environment, an uncertainty of a location of the at least one mobile munition assembly 10 in the mission environment, a latency in the secure network 102, an identification of one or more unauthorized devices on the secure network 102, an alert that the munition 70 is not configured to be launched from one of the one or more launchers 30 in the mobile munition assembly 10, an alert that at least one of the one or more launchers 30 does not have sufficient power to enable a launch of the munition 70 in the mission environment 90, an alert that the warhead 84 located with the munition 70 does not conform with the parameters of the mission, or an alert that at least one of the one or more launchers 30 is not arranged in an orientation to enable a vertical launch of the munition 70 from the surface 97 of the launch terrain 96. In other optional embodiments, the mission error 216 detected by the one or more electronic devices 110 may include at least one of an alert that the munition receptacle 32 is not properly or sufficiently inserted into the at least one of the one or more launchers 30, or an alert that the munition 70 is not properly loaded into the munition receptacle 32 inserted into the at least one of the one or more launchers 30. In further optional embodiments, the mission error 216 may include at least one of invalid or incorrectly formatted data in at least one of the one or more electronic devices 110, a loss of data, such as data on the content provider 148 of at least one of the one or more electronic devices 110, missing (or absent) entries of parameters or the one or more predefined rules 210 in the content provider 148 indicating a loss of signal among the one or more electronic devices 110 or the network 102, out-of-sequence entries of parameters in the content provider 148 indicating clock- or time-related errors, missing (or absent) or misconfigured test messages injected into the mission module 140, or an overflow of at least one or more electronic devices 110 or the network 102 caused by, for example, a denial-of-service or distributed denial-of-service, out-of-sequence entries, or simultaneous updating of more than one of the one or more electronic devices 110, such as updating the mission module 140 or another routine software component residing on the one or more electronic devices 110.

Where the plurality of test messages have been sent (or injected), at periodic intervals, from the safety module 150 to the mission module 140 of the mission approval unit 130, such that the mission error 216 is detected or not detected (and otherwise ignored or acknowledged), the method may 200 may continue with an operation 218 of requesting an authorization or a denial of the mission for the at least one mobile munition assembly 10. Such a request of the authorization or the denial of the mission for the at least one mobile munition assembly 10 may be communicated from the plug-in 144 of the mission module 140 to the safety module 150, wherein the safety module 150 evaluates whether to accept or to reject the request for the authorization of the mission for the at least one mobile munition assembly 10. Evaluation may be effectuated through an evaluation, by the safety module 150, of the application of the one or more predefined rules 210 to the parameters of the mission, including two-dimensional or three-dimensional assessments of the one or more targetable assets 92, the one or more non-targetable assets 94, locations of the one or more electronic devices 110 and the at least one mobile munition assembly 10, and/or the mission environment 90. Application of the one or more predefined rules 210 may be based on at least the status of the situational awareness (SA) corresponding to the one or more electronic devices 110, as previously set forth herein. The method 200 may continue with an operation 220 of receiving the authorization of the mission for the at least one mobile munition assembly 10 in the mission environment 90. The plug-in 144 of the mission module 140 may receive the authorization from the safety module 150; but, to the extent the denial of the mission for the at least one mobile munition assembly 10 is received, the method 200 may return to the operation 218 of requesting the authorization of the mission for the at least one mobile munition assembly 10 until the mission is authorized to be executed in the mission environment 90. To the extent the authorization of the mission for the at least one mobile munition assembly 10 is accepted, the mission may be signed, or otherwise authenticated, such as through public/private two-path authentication exchanged among the one or more electronic devices 110. Each such signature or authentication of the mission for the at least one mobile munition assembly 10 may be unique to each of the one or more electronic devices 110.

Referring to FIG. 5, the method 200 may proceed with an operation 222 of selecting one or more of the at least one mobile munition assembly 10 to launch the munition 70 from the one or more of the at least one mobile munition assembly 10 in the mission environment 90. The mission module 140 of the mission execution unit 130 of each of the one or more electronic devices 110 may select, whether by user input or through autonomous selection of the at least one mobile munition assembly 10, which of the at least one mobile munition assembly 10 should be selected to launch the munition 70 in the mission environment 90. Such selection may be based upon, among other things, geographical proximity or physical proximity of the at least one mobile munition assembly 10 to the one or more targetable assets 92, the one or more non-targetable assets 94, the altitude 98 of the launch of the munition 70, a distance of the flight path 99 of the munition 70, or other characteristics pertaining to the mission environment 90, as previously discussed.

Referring to FIG. 5, the method 200 may proceed with an operation 224 of commanding the one or more of the at least one mobile munition assembly 10 to launch the munition 70 from the one or more of the at least one mobile munition assembly 10 in the mission environment 90. The operation 224 of commanding the one or more of the at least one mobile munition assembly 10, having been selected in accordance with the operation 222, may be remotely effectuated by the one or more electronic devices 110, or by a one of the one or more electronic devices 110 associated with the at least one mobile munition assembly 10. Such command may be made by a transceiver, or two-way radio, residing with the communication unit 114 of the one or more electronic devices 110, and sent to another transceiver, or other two-way radio, of the one or more launchers 30, so as to initiate a launch of the munition 70 from the at least one mobile munition assembly 10.

Referring to FIGS. 5 and 9, the method 200 may continue with an operation 226 of launching the munition 70 from the at least one mobile munition assembly 10. The munition 70 may be configured to strike one or more targetable assets 92 in the mission environment 90 within a targetable range 91 of one or more of the at least one mobile munition assembly 10, such as the first mobile munition assembly 10A, the second mobile munition assembly 10B, and/or the third mobile munition assembly 10C. The operation 226 of launching the munition 70 may vertically launch the munition 70, in its launch configuration 88, to the altitude 98 (or the height 98) from the surface 97 of the launch terrain 96 in the mission environment, including a height of up to about eight (8) kilometers. In optional embodiments of the method 200, the method 200 may continue with a step 228 of guiding the munition 70 in the flight path 99, in its flight configuration 89, to one of the one or more targetable assets 92 within the mission environment 90. In optional embodiments, the flight path 99 may achieve a horizontal distance beginning from the launch terrain 96 to the one or more targetable assets 92 in the mission environment 90, the horizontal distance ranging up to about 100 kilometers. In optional embodiments, the step 228 of guiding the munition 70 in the flight path 228 may be effectuated by global positioning system (GPS) navigation or inertial guidance system (IGS) navigation, and combinations thereof, or alternatively by inertial guidance system (IGS) navigation where global positioning system is denied by obstruction with the external source, such as the satellite.

Referring to FIGS. 5 and 9, the method 200 may continue with an operation 230 of impacting the munition 70 against or on one of the one or more targetable assets 92 in the mission environment 90, or the method 200 may continue with an operation 232 of disabling the flight path 99 of the munition 70 in the mission environment 90 such that the munition 70 does not make impact with or against the one of the one or more targetable assets 92 in the mission environment 90. Continuing with the operation 230, the munition 90 may proceed along the flight path 99 (guided or not) in the direction of the one or more targetable assets 92, eventually terminating in an impact on the one or more targetable assets 92 in the mission environment 90. At impact, the warhead 84 within the munition 70 may be detonated by the fuze, wherein the fuze is any one of a time-based fuze, a proximity-based fuze, an impact-based fuze, a distance-measuring fuze, or an electronic-time fuze. Continuing with the operation 232 of disabling the flight path 99, the one or more electronic devices 110 may remotely terminate the flight path 99 of the munition 70 where any one of the following conditions are met or triggered: the munition 70 is disabled by a user-initiated event, either by remotely terminating the motor of the munition 70 or remotely altering the flight path 99 by and through the guidance system 87 of the munition 70; the one or more targetable assets 92 are identified within, or become located in proximity to, the one or more non-targetable assets 94 during the flight path 99 of the munition 70; or at least one of the two or more fins, such as the first fins 80 and/or the second fins 82, or at least one of the two or more wings 86, and combinations thereof, are detached from the munition frame 71 or are otherwise damaged or rendered unworkable.

To facilitate the understanding of the embodiments described herein, a number of terms have been defined above. The terms defined herein have meanings as commonly understood by a person of ordinary skill in the areas relevant to the present invention. The terminology herein is used to describe specific embodiments of the invention, but their usage does not delimit the invention, except as set forth in the claims.

The term "user" as used herein unless otherwise stated may refer to an operator, such as a soldier or other individual operating in the mission environment 90, an autonomous system, or any other person or entity as may be, e.g., associated with the electronic device 110, the at least one mobile munition assembly 10, the system 100, the network 102, and/or the administrator 104.

The term "mobile," as used in connection with the at least one mobile munition assembly 10, should be interpreted to mean portable, movable, mobile, haulable, transportable, or wieldy, such that a human-user (e.g., solider or other individual operating in the mission environment 90) may manageably lift, carry, and/or transport the at least one mobile munition assembly 10 in the mission environment 90.

The term "processor" as used herein may refer to at least general-purpose or specific-purpose processing devices, such as a central processing unit, and/or logic as may be understood by one of skill in the art, including but not limited to a microprocessor, a microcontroller, a state machine, and the like. The processor can also be implemented as a combination of computing devices, e.g., a combination of a digital signal processor (DSP) and a microprocessor, a plurality of microprocessors, one or more microprocessors in conjunction with a DSP core, or any other such configuration.

The terms "connected," "attached," "mounted," "fixed," "supported," "engaged," and the like, or any variation thereof, when referring to any mechanical, structural, physical, or tangible construction or configuration, should be interpreted to mean any manner of joining two objects including, but not limited to, the use of any fasteners such as screws, nuts and bolts, bolts, pin and clevis, and the like allowing for a stationary, translatable, or pivotable relationship; being integrally formed as a single part together; any mechanical fit such as a friction fit, interference fit, slidable fit, rotatable fit, pivotable fit, and the like; any combination thereof; and the like.

It is understood that various operations, steps, or algorithms, including the method 200, as described in connection with the system 100, including (without limitation) the one or more electronic devices 110 (including those of the one or more electronic devices 110 associated with the at least one mobile munition assembly 10), the administrator 104, or alternative devices or computer structures or hierarchies, can be embodied directly in hardware, in a computer program product such as a software module executed by the processor 13 or any process related to, or embodied by, the foregoing. The computer program product can reside in the storage 18, which may include RAM memory, flash memory, ROM memory, EPROM memory, EEPROM memory, registers, hard disk, a removable disk, or any other form of computer-readable medium known in the art.

Terms such as "a," "an," and "the" are not intended to refer to only a singular entity, but rather include the general class of which a specific example may be used for illustration.

The phrases "in one embodiment," "in optional embodiment(s)," and "in an exemplary embodiment," or variations thereof, as used herein does not necessarily refer to the same embodiment, although it may.

As used herein, the phrases "one or more," "at least one," "at least one of," and "one or more of," or variations thereof, when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. The conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Thus, such conditional language is not generally intended to imply that features, elements, and/or states are in any way required for one or more embodiments, whether these features, elements, and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this disclosure except as set forth in the following claims. Thus, it is seen that the apparatus of the present disclosure readily achieves the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims.

What is claimed is:

1. A method of executing a mission for at least one mobile munition assembly in a mission environment, the at least one mobile munition assembly comprising a container having a container frame, the container frame having a first end distally located from a second end, and the container frame enclosing one or more launchers, each of the one or more launchers configured to receive a munition, the method comprising:
    operating a stabilizer associated with the at least one mobile munition assembly to place the container in an upright position such that an axis defined along the container frame from the first end to the second end is generally orthogonal to a surface of a launch terrain upon which the container is mounted;
    forming a secure network of one or more electronic devices with one another in the mission environment when the one or more electronic devices are communicatively coupled to, and in association with, one another, at least one of the one or more electronic devices associated with one or more of the at least one mobile munition assembly;
    transmitting a status of a situational awareness (SA) corresponding to each of the one or more electronic devices in the mission environment;
    enabling an input of parameters of the mission for the at least one mobile munition assembly in the mission environment, the parameters having one or more predefined rules associated therewith, the one or more predefined rules configured to be applied to the parameters based on at least the status of the situational awareness (SA);
    the one or more predefined rules comprising a method of control of the munition subsequent to launch and during a directionally dynamic flight path;
    detecting, by at least one of the one or more electronic devices not associated with the at least one mobile munition assembly, the upright position of the container;
    establishing an omnidirectional targetable range outwardly extending from a position of each of the at least one mobile munition assembly in the mission environment;
    subsequent to enabling the input of parameters, detecting the upright position, and establishing the omnidirectional targetable range, requesting an authorization or a denial of the mission for the at least one mobile munition assembly;
    where an authorized mission request is received, launching the munition, in a launch configuration, in the directionally dynamic flight path; and
    subsequent to launch the munition, monitoring a condition of the munition associated with at least one of guiding, in a flight configuration, the munition within the omnidirectional targetable range, or disabling the directionally dynamic flight path of the munition.

2. The method of claim 1, further comprising:
deploying the at least one mobile munition assembly on the surface of the launch terrain in the mission environment.

3. The method of claim 1, further comprising:
identifying one or more targetable assets and one or more non-targetable assets in the mission environment based at least on the parameters of the mission for the at least one mobile munition assembly and an application of the one or more predefined rules to the parameters of the mission.

4. The method of claim 3, wherein:
the one or more non-targetable assets include locations corresponding to the one or more electronic devices in the mission environment.

5. The method of claim 1, wherein:
the one or more predefined rules related to the parameters of the mission include at least one of information corresponding to at least to one of a location of the one or more electronic devices in the mission environment, a location of the at least one mobile munition assembly in the mission environment, an identification of one or more targetable assets in the mission environment, an identification of one or more non-targetable assets in the mission environment, an altitude of the munition when launched from the at least one mobile munition assembly, a trajectory of the munition when launched from the at least one mobile munition assembly, a flight path of the munition when launched from the at least mobile munition assembly, a type of warhead located within the munition, an impact radius of the munition, or a time constraint on the mission.

6. The method of claim 1, further comprising:
receiving the authorization of the mission for the at least one mobile munition assembly in the mission environment.

7. The method of claim 6, further comprising:
selecting one or more of the at least one mobile munition assembly to launch the munition from the one or more of the at least one mobile munition assembly in the mission environment.

8. The method of claim 7 further comprising:
commanding the one or more of the at least one mobile munition assembly to launch the munition from the one or more of the at least one mobile munition assembly in the mission environment.

9. The method of claim 1, further comprising:
reporting whether there is a mission error detected by the one or more electronic devices in the mission environment.

10. The method of claim 9, wherein:
the mission error detected by the one or more electronic devices in the mission environment includes at least one of a loss of communication, on the secure network, of the one or more electronic devices in the mission environment, an uncertainty of a location of the one or more electronic devices in the mission environment, an uncertainty of a location of the at least one mobile munition assembly in the mission environment, a latency in the secure network, an identification of one or more unauthorized devices on the secure network, an alert that the munition is not configured to be launched from one of the one or more launchers in the mobile munition assembly, an alert that at least one of the one or more launchers does not have sufficient power to enable a launch of the munition in the mission environment, an alert that a warhead located with the munition does not conform with the parameters of the mission, or an alert that at least one of the one or more launchers is not arranged in an orientation to enable a vertical launch of the munition.

11. The method of claim 1, wherein:
the munition includes a warhead having a length ranging from about ten (10) inches to about twenty (20) inches and a weight between about eight (8) pounds and fifteen (15) pounds.

12. The method of claim 1, wherein:
the secure network comprises a mobile ad-hoc network (MANET) or a wireless mesh network (WMN).

13. The method of claim 1, wherein the stabilizer associated with the at least one mobile munition assembly is operated from a first configuration, wherein a plurality of legs thereof are folded up adjacent to the container frame, to a second configuration, wherein the plurality of legs are pivoted away from the container frame, to place the container in the upright position.

14. The method of claim 1, further comprising:
operating the munition from the launch configuration to the flight configuration by deploying at least one of a wing or a fin.

* * * * *